(12) United States Patent
Levant

(10) Patent No.: US 11,321,028 B2
(45) Date of Patent: May 3, 2022

(54) CORRECTING REGISTRATION ERRORS IN DIGITAL PRINTING

(71) Applicant: Landa Corporation Ltd., Rehovot (IL)

(72) Inventor: Boris Levant, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 17/106,245

(22) Filed: Nov. 30, 2020

(65) Prior Publication Data

US 2021/0182001 A1 Jun. 17, 2021

Related U.S. Application Data

(60) Provisional application No. 62/946,455, filed on Dec. 11, 2019.

(51) Int. Cl.
*G06T 7/00* (2017.01)
*G06F 3/12* (2006.01)

(52) U.S. Cl.
CPC .......... *G06F 3/1234* (2013.01); *G06F 3/121* (2013.01); *G06T 7/0004* (2013.01); *G06T 2207/20081* (2013.01); *G06T 2207/20084* (2013.01); *G06T 2207/30144* (2013.01)

(58) Field of Classification Search
CPC ...... G06F 3/1234; G06F 3/121; G06F 11/006; G06T 7/001; G06T 2207/20081
USPC ................. 358/1.14, 3.26, 1.9, 538; 382/190
See application file for complete search history.

(56) References Cited

U.S. PATENT DOCUMENTS

| | | | |
|---|---|---|---|
| 2,839,181 | A | 6/1958 | Renner |
| 3,011,545 | A | 12/1961 | Welsh et al. |
| 3,053,319 | A | 9/1962 | Cronin et al. |
| 3,697,551 | A | 10/1972 | Thomson |
| 3,697,568 | A | 10/1972 | Boissieras et al. |
| 3,889,802 | A | 6/1975 | Jonkers |
| 3,898,670 | A | 8/1975 | Erikson et al. |

(Continued)

FOREIGN PATENT DOCUMENTS

| | | | |
|---|---|---|---|
| CN | 1121033 | A | 4/1996 |
| CN | 1200085 | A | 11/1998 |

(Continued)

OTHER PUBLICATIONS

"Amino Functional Silicone Polymers", in Xiameter.Copyrgt. 2009 Dow Corning Corporation.

(Continued)

*Primary Examiner* — Jamares Q Washington
(74) *Attorney, Agent, or Firm* — Kligler & Associates Patent Attorneys Ltd

(57) ABSTRACT a method for correcting an error in image printing, the method includes receiving a reference digital image (RDI). Based on a predefined selection criterion, one or more regions in the RDI that are suitable for use as anchor features for sensing the error, are selected. A digital image (DI) acquired from a printed image of the RDI, is received and the one or more regions are identified in the DI. Based on the anchor features of the DI, the error is estimated in the printed image. A correction that, when applied to the DI, compensates for the estimated error, is calculated. The estimated error is corrected in a subsequent digital image (SDI) to be printed, and the SDI having the corrected error, is printed.

16 Claims, 5 Drawing Sheets

(56) References Cited

U.S. PATENT DOCUMENTS

| | | |
|---|---|---|
| 3,947,113 A | 3/1976 | Buchan et al. |
| 4,009,958 A | 3/1977 | Kurita et al. |
| 4,093,764 A | 6/1978 | Duckett |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,586,807 A | 5/1986 | Yuasa |
| 4,642,654 A | 2/1987 | Toganoh et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,305,099 A | 4/1994 | Morcos |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,471,233 A | 11/1995 | Okamoto et al. |
| 5,532,314 A | 7/1996 | Sexsmith |
| 5,552,875 A | 9/1996 | Sagiv et al. |
| 5,575,873 A | 11/1996 | Pieper et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,683,841 A | 11/1997 | Kato |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,780,412 A | 7/1998 | Scarborough et al. |
| 5,841,456 A | 11/1998 | Takei et al. |
| 5,859,076 A | 1/1999 | Kozma et al. |
| 5,865,299 A | 2/1999 | Williams |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,318,853 B1 | 11/2001 | Asano et al. |
| 6,332,943 B1 | 12/2001 | Herrmann et al. |
| 6,335,046 B1 | 1/2002 | Mackey |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |
| 6,397,034 B1 | 5/2002 | Tarnawskyj et al. |
| 6,400,913 B1 | 6/2002 | De et al. |
| 6,402,317 B2 | 6/2002 | Yanagawa et al. |
| 6,405,006 B1 | 6/2002 | Tabuchi |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,633,735 B2 | 10/2003 | Kellie et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |

(56) References Cited

U.S. PATENT DOCUMENTS

| | | |
|---|---|---|
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,129,858 B2 | 10/2006 | Ferran et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,038,284 B2 | 10/2011 | Hori et al. |
| 8,041,275 B2 | 10/2011 | Soria et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,119,315 B1 | 2/2012 | Heu et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,071 B2 | 11/2012 | Eun |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 9,004,629 B2 | 4/2015 | De et al. |
| 9,186,884 B2 | 11/2015 | Landa et al. |
| 9,207,585 B2 | 12/2015 | Hatano et al. |
| 9,227,429 B1 | 1/2016 | Lestrange et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,290,016 B2 | 3/2016 | Landa et al. |
| 9,327,496 B2 | 5/2016 | Landa et al. |
| 9,327,519 B1 | 5/2016 | Larson et al. |
| 9,353,273 B2 | 5/2016 | Landa et al. |
| 9,381,736 B2 | 7/2016 | Landa et al. |
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 10,065,411 B2 | 9/2018 | Landa et al. |
| 10,175,613 B2 | 1/2019 | Watanabe |
| 10,179,447 B2 | 1/2019 | Shmaiser et al. |
| 10,190,012 B2 | 1/2019 | Landa et al. |
| 10,195,843 B2 | 2/2019 | Landa et al. |
| 10,201,968 B2 | 2/2019 | Landa et al. |
| 10,226,920 B2 | 3/2019 | Shmaiser et al. |
| 10,266,711 B2 | 4/2019 | Landa et al. |
| 10,300,690 B2 | 5/2019 | Landa et al. |
| 10,357,963 B2 | 7/2019 | Landa et al. |
| 10,357,985 B2 | 7/2019 | Landa et al. |
| 10,427,399 B2 | 10/2019 | Shmaiser et al. |
| 10,434,761 B2 | 10/2019 | Landa et al. |
| 10,477,188 B2 | 11/2019 | Stiglic et al. |
| 10,518,526 B2 | 12/2019 | Landa et al. |
| 10,569,532 B2 | 2/2020 | Shmaiser et al. |
| 10,569,533 B2 | 2/2020 | Landa et al. |
| 10,569,534 B2 | 2/2020 | Shmaiser et al. |
| 10,576,734 B2 | 3/2020 | Landa et al. |
| 10,596,804 B2 | 3/2020 | Landa et al. |
| 10,632,740 B2 | 4/2020 | Landa et al. |
| 10,642,198 B2 | 5/2020 | Landa et al. |
| 10,703,094 B2 | 7/2020 | Shmaiser et al. |
| 10,730,333 B2 | 8/2020 | Landa et al. |
| 10,759,953 B2 | 9/2020 | Landa et al. |
| 10,800,936 B2 | 10/2020 | Landa et al. |
| 10,828,888 B2 | 11/2020 | Landa et al. |
| 10,889,128 B2 | 1/2021 | Landa et al. |
| 2001/0022607 A1 | 9/2001 | Takahashi et al. |

(56) References Cited

U.S. PATENT DOCUMENTS

| | | | |
|---|---|---|---|
| 2001/0033688 A1* | 10/2001 | Taylor | G06K 17/0032 382/181 |
| 2002/0041317 A1 | 4/2002 | Kashiwazaki et al. | |
| 2002/0064404 A1 | 5/2002 | Iwai | |
| 2002/0102374 A1 | 8/2002 | Gervasi et al. | |
| 2002/0121220 A1 | 9/2002 | Lin | |
| 2002/0150408 A1 | 10/2002 | Mosher et al. | |
| 2002/0164494 A1 | 11/2002 | Grant et al. | |
| 2002/0197481 A1 | 12/2002 | Jing et al. | |
| 2003/0004025 A1 | 1/2003 | Okuno et al. | |
| 2003/0007055 A1 | 1/2003 | Ogawa | |
| 2003/0018119 A1 | 1/2003 | Frenkel et al. | |
| 2003/0030686 A1 | 2/2003 | Abe et al. | |
| 2003/0032700 A1 | 2/2003 | Morrison et al. | |
| 2003/0041777 A1 | 3/2003 | Karl et al. | |
| 2003/0043258 A1 | 3/2003 | Kerr et al. | |
| 2003/0054139 A1 | 3/2003 | Ylitalo et al. | |
| 2003/0055129 A1 | 3/2003 | Alford | |
| 2003/0063179 A1 | 4/2003 | Adachi | |
| 2003/0064317 A1 | 4/2003 | Bailey et al. | |
| 2003/0081964 A1 | 5/2003 | Shimura et al. | |
| 2003/0118381 A1 | 6/2003 | Law et al. | |
| 2003/0129435 A1 | 7/2003 | Blankenship et al. | |
| 2003/0186147 A1 | 10/2003 | Pickering et al. | |
| 2003/0214568 A1 | 11/2003 | Nishikawa et al. | |
| 2003/0234849 A1 | 12/2003 | Pan et al. | |
| 2004/0003863 A1 | 1/2004 | Eckhardt | |
| 2004/0020382 A1 | 2/2004 | McLean et al. | |
| 2004/0036758 A1 | 2/2004 | Sasaki et al. | |
| 2004/0047666 A1 | 3/2004 | Imaizumi et al. | |
| 2004/0087707 A1 | 5/2004 | Zoch et al. | |
| 2004/0123761 A1 | 7/2004 | Szumla et al. | |
| 2004/0125188 A1 | 7/2004 | Szumla et al. | |
| 2004/0145643 A1 | 7/2004 | Nakamura | |
| 2004/0173111 A1 | 9/2004 | Okuda | |
| 2004/0200369 A1 | 10/2004 | Brady | |
| 2004/0228642 A1 | 11/2004 | Iida et al. | |
| 2004/0246324 A1 | 12/2004 | Nakashima | |
| 2004/0246326 A1 | 12/2004 | Dwyer et al. | |
| 2004/0252175 A1 | 12/2004 | Bejat et al. | |
| 2005/0031807 A1 | 2/2005 | Quintens et al. | |
| 2005/0082146 A1 | 4/2005 | Axmann | |
| 2005/0110855 A1 | 5/2005 | Taniuchi et al. | |
| 2005/0111861 A1 | 5/2005 | Calamita et al. | |
| 2005/0134874 A1 | 6/2005 | Overall et al. | |
| 2005/0150408 A1 | 7/2005 | Hesterman | |
| 2005/0185009 A1 | 8/2005 | Claramunt et al. | |
| 2005/0195235 A1 | 9/2005 | Kitao | |
| 2005/0235870 A1 | 10/2005 | Ishihara | |
| 2005/0266332 A1 | 12/2005 | Pavlisko et al. | |
| 2005/0272334 A1 | 12/2005 | Wang et al. | |
| 2006/0004123 A1 | 1/2006 | Wu et al. | |
| 2006/0135709 A1 | 6/2006 | Hasegawa et al. | |
| 2006/0164488 A1 | 7/2006 | Taniuchi et al. | |
| 2006/0164489 A1 | 7/2006 | Vega et al. | |
| 2006/0192827 A1 | 8/2006 | Takada et al. | |
| 2006/0233578 A1 | 10/2006 | Maki et al. | |
| 2006/0286462 A1 | 12/2006 | Jackson et al. | |
| 2007/0014595 A1 | 1/2007 | Kawagoe | |
| 2007/0025768 A1 | 2/2007 | Komatsu et al. | |
| 2007/0029171 A1 | 2/2007 | Nemedi | |
| 2007/0045939 A1 | 3/2007 | Toya et al. | |
| 2007/0054981 A1 | 3/2007 | Yanagi et al. | |
| 2007/0064077 A1 | 3/2007 | Konno | |
| 2007/0077520 A1 | 4/2007 | Maemoto | |
| 2007/0120927 A1 | 5/2007 | Snyder et al. | |
| 2007/0123642 A1 | 5/2007 | Banning et al. | |
| 2007/0134030 A1 | 6/2007 | Lior et al. | |
| 2007/0144368 A1 | 6/2007 | Barazani et al. | |
| 2007/0146462 A1 | 6/2007 | Taniuchi et al. | |
| 2007/0147894 A1 | 6/2007 | Yokota et al. | |
| 2007/0166071 A1 | 7/2007 | Shima | |
| 2007/0176995 A1 | 8/2007 | Kadomatsu et al. | |
| 2007/0189819 A1 | 8/2007 | Uehara et al. | |
| 2007/0199457 A1 | 8/2007 | Cyman et al. | |
| 2007/0229639 A1 | 10/2007 | Yahiro | |
| 2007/0253726 A1 | 11/2007 | Kagawa | |
| 2007/0257955 A1 | 11/2007 | Tanaka et al. | |
| 2007/0285486 A1 | 12/2007 | Harris et al. | |
| 2008/0006176 A1 | 1/2008 | Houjou | |
| 2008/0030536 A1 | 2/2008 | Furukawa et al. | |
| 2008/0032072 A1 | 2/2008 | Taniuchi et al. | |
| 2008/0044587 A1 | 2/2008 | Maeno et al. | |
| 2008/0055356 A1 | 3/2008 | Yamanobe | |
| 2008/0055381 A1 | 3/2008 | Doi et al. | |
| 2008/0074462 A1 | 3/2008 | Hirakawa | |
| 2008/0112912 A1 | 5/2008 | Springob et al. | |
| 2008/0124158 A1 | 5/2008 | Folkins | |
| 2008/0138546 A1 | 6/2008 | Soria et al. | |
| 2008/0166495 A1 | 7/2008 | Maeno et al. | |
| 2008/0167185 A1 | 7/2008 | Hirota | |
| 2008/0175612 A1 | 7/2008 | Oikawa et al. | |
| 2008/0196612 A1 | 8/2008 | Rancourt et al. | |
| 2008/0196621 A1 | 8/2008 | Ikuno et al. | |
| 2008/0213548 A1 | 9/2008 | Koganehira et al. | |
| 2008/0236480 A1 | 10/2008 | Furukawa et al. | |
| 2008/0253812 A1 | 10/2008 | Pearce et al. | |
| 2009/0022504 A1 | 1/2009 | Kuwabara et al. | |
| 2009/0041515 A1 | 2/2009 | Kim | |
| 2009/0041932 A1 | 2/2009 | Ishizuka et al. | |
| 2009/0064884 A1 | 3/2009 | Hook et al. | |
| 2009/0074492 A1 | 3/2009 | Ito | |
| 2009/0082503 A1 | 3/2009 | Yanagi et al. | |
| 2009/0087565 A1 | 4/2009 | Houjou | |
| 2009/0098385 A1 | 4/2009 | Kaemper et al. | |
| 2009/0116885 A1 | 5/2009 | Ando | |
| 2009/0148200 A1 | 6/2009 | Hara et al. | |
| 2009/0165937 A1 | 7/2009 | Inoue et al. | |
| 2009/0185204 A1* | 7/2009 | Wu | H04N 1/60 358/1.9 |
| 2009/0190951 A1 | 7/2009 | Torimaru et al. | |
| 2009/0202275 A1 | 8/2009 | Nishida et al. | |
| 2009/0211490 A1 | 8/2009 | Ikuno et al. | |
| 2009/0220873 A1 | 9/2009 | Enomoto et al. | |
| 2009/0237479 A1 | 9/2009 | Yamashita et al. | |
| 2009/0256896 A1 | 10/2009 | Scarlata | |
| 2009/0279170 A1 | 11/2009 | Miyazaki et al. | |
| 2009/0315926 A1 | 12/2009 | Yamanobe | |
| 2009/0317555 A1 | 12/2009 | Hori | |
| 2009/0318591 A1 | 12/2009 | Ageishi et al. | |
| 2010/0012023 A1 | 1/2010 | Lefevre et al. | |
| 2010/0053292 A1 | 3/2010 | Thayer et al. | |
| 2010/0053293 A1 | 3/2010 | Thayer et al. | |
| 2010/0066796 A1 | 3/2010 | Yanagi et al. | |
| 2010/0075843 A1 | 3/2010 | Ikuno et al. | |
| 2010/0086692 A1 | 4/2010 | Ohta et al. | |
| 2010/0091064 A1 | 4/2010 | Araki et al. | |
| 2010/0225695 A1 | 9/2010 | Fujikura | |
| 2010/0231623 A1 | 9/2010 | Hirato | |
| 2010/0239789 A1 | 9/2010 | Umeda | |
| 2010/0245511 A1 | 9/2010 | Ageishi | |
| 2010/0282100 A1 | 11/2010 | Okuda et al. | |
| 2010/0285221 A1 | 11/2010 | Oki et al. | |
| 2010/0300604 A1 | 12/2010 | Goss et al. | |
| 2010/0303504 A1 | 12/2010 | Funamoto et al. | |
| 2010/0310281 A1 | 12/2010 | Miura et al. | |
| 2011/0044724 A1 | 2/2011 | Funamoto et al. | |
| 2011/0058001 A1 | 3/2011 | Gila et al. | |
| 2011/0058859 A1 | 3/2011 | Nakamatsu et al. | |
| 2011/0069110 A1 | 3/2011 | Matsumoto et al. | |
| 2011/0069117 A1 | 3/2011 | Ohzeki et al. | |
| 2011/0085828 A1 | 4/2011 | Kosako et al. | |
| 2011/0128300 A1 | 6/2011 | Gay et al. | |
| 2011/0141188 A1 | 6/2011 | Morita | |
| 2011/0149002 A1 | 6/2011 | Kessler | |
| 2011/0150509 A1 | 6/2011 | Komiya | |
| 2011/0150541 A1 | 6/2011 | Michibata | |
| 2011/0169889 A1 | 7/2011 | Kojima et al. | |
| 2011/0195260 A1 | 8/2011 | Lee et al. | |
| 2011/0199414 A1 | 8/2011 | Lang | |
| 2011/0234683 A1 | 9/2011 | Komatsu | |
| 2011/0234689 A1 | 9/2011 | Saito | |
| 2011/0242181 A1 | 10/2011 | Otobe | |
| 2011/0249090 A1 | 10/2011 | Moore et al. | |

(56) References Cited

U.S. PATENT DOCUMENTS

| | | |
|---|---|---|
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0094091 A1 | 4/2012 | Van et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0154497 A1 | 6/2012 | Nakao et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0194830 A1 | 8/2012 | Gaertner et al. |
| 2012/0237260 A1 | 9/2012 | Sengoku et al. |
| 2012/0287260 A1 | 11/2012 | Lu et al. |
| 2012/0301186 A1 | 11/2012 | Yang et al. |
| 2012/0314013 A1 | 12/2012 | Takemoto et al. |
| 2012/0314077 A1 | 12/2012 | Clavenna, II et al. |
| 2013/0011158 A1 | 1/2013 | Meguro et al. |
| 2013/0017006 A1 | 1/2013 | Suda |
| 2013/0044188 A1 | 2/2013 | Nakamura et al. |
| 2013/0057603 A1 | 3/2013 | Gordon |
| 2013/0088543 A1 | 4/2013 | Tsuji et al. |
| 2013/0120513 A1 | 5/2013 | Thayer et al. |
| 2013/0182045 A1 | 7/2013 | Ohzeki et al. |
| 2013/0201237 A1 | 8/2013 | Thomson et al. |
| 2013/0234080 A1 | 9/2013 | Torikoshi et al. |
| 2013/0242016 A1 | 9/2013 | Edwards et al. |
| 2013/0302065 A1 | 11/2013 | Mori et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0153956 A1 | 6/2014 | Yonemoto |
| 2014/0168330 A1 | 6/2014 | Liu et al. |
| 2014/0175707 A1 | 6/2014 | Wolk et al. |
| 2014/0198162 A1 | 7/2014 | Dirubio et al. |
| 2014/0232782 A1 | 8/2014 | Mukai et al. |
| 2014/0267777 A1 | 9/2014 | Le et al. |
| 2014/0334855 A1 | 11/2014 | Onishi et al. |
| 2014/0339056 A1 | 11/2014 | Iwakoshi et al. |
| 2015/0022605 A1 | 1/2015 | Mantell et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0085038 A1 | 3/2015 | Liu |
| 2015/0116408 A1 | 4/2015 | Armbruster et al. |
| 2015/0118503 A1 | 4/2015 | Landa et al. |
| 2015/0165758 A1 | 6/2015 | Sambhy et al. |
| 2015/0195509 A1 | 7/2015 | Phipps |
| 2015/0210065 A1 | 7/2015 | Kelly et al. |
| 2015/0304531 A1 | 10/2015 | Rodriguez et al. |
| 2015/0315403 A1 | 11/2015 | Song et al. |
| 2015/0336378 A1 | 11/2015 | Guttmann et al. |
| 2015/0361288 A1 | 12/2015 | Song et al. |
| 2016/0031246 A1 | 2/2016 | Sreekumar et al. |
| 2016/0222232 A1 | 8/2016 | Landa et al. |
| 2016/0250879 A1 | 9/2016 | Chen et al. |
| 2016/0286462 A1 | 9/2016 | Gohite et al. |
| 2016/0375680 A1 | 12/2016 | Nishitani et al. |
| 2017/0028688 A1 | 2/2017 | Dannhauser et al. |
| 2017/0104887 A1 | 4/2017 | Nomura |
| 2018/0259888 A1 | 9/2018 | Mitsui et al. |
| 2018/0348672 A1 | 12/2018 | Yoshida |
| 2018/0348675 A1 | 12/2018 | Nakamura et al. |
| 2019/0016114 A1 | 1/2019 | Sugiyama et al. |
| 2019/0094727 A1 | 3/2019 | Landa et al. |
| 2019/0152218 A1 | 5/2019 | Stein et al. |
| 2019/0218411 A1 | 7/2019 | Landa et al. |
| 2019/0366705 A1 | 12/2019 | Landa et al. |
| 2019/0389230 A1 | 12/2019 | Landa et al. |
| 2020/0156366 A1 | 5/2020 | Shmaiser et al. |
| 2020/0171813 A1 | 6/2020 | Chechik et al. |
| 2020/0198322 A1 | 6/2020 | Landa et al. |
| 2020/0276801 A1 | 9/2020 | Landa et al. |
| 2020/0290340 A1 | 9/2020 | Chechik et al. |
| 2020/0314413 A1 | 10/2020 | Stiglic et al. |
| 2020/0326646 A1 | 10/2020 | Landa et al. |
| 2020/0353746 A1 | 11/2020 | Landa et al. |
| 2020/0361202 A1 | 11/2020 | Burkatovsky |
| 2020/0376878 A1 | 12/2020 | Landa et al. |
| 2020/0384758 A1 | 12/2020 | Shmaiser et al. |
| 2021/0001622 A1 | 1/2021 | Landa et al. |
| 2021/0245528 A1 | 8/2021 | Landa et al. |
| 2021/0260869 A1 | 8/2021 | Landa et al. |
| 2021/0268793 A1 | 9/2021 | Burkatovsky |
| 2021/0283899 A1 | 9/2021 | Landa et al. |
| 2021/0309020 A1 | 10/2021 | Siman Tov et al. |
| 2021/0394531 A1 | 12/2021 | Helena et al. |

FOREIGN PATENT DOCUMENTS

| | | |
|---|---|---|
| CN | 1212229 A | 3/1999 |
| CN | 1324901 A | 12/2001 |
| CN | 1445622 A | 10/2003 |
| CN | 1493514 A | 5/2004 |
| CN | 1535235 A | 10/2004 |
| CN | 1555422 A | 12/2004 |
| CN | 1680506 A | 10/2005 |
| CN | 1720187 A | 1/2006 |
| CN | 1261831 C | 6/2006 |
| CN | 1809460 A | 7/2006 |
| CN | 1289368 C | 12/2006 |
| CN | 101073937 A | 11/2007 |
| CN | 101177057 A | 5/2008 |
| CN | 101249768 A | 8/2008 |
| CN | 101344746 A | 1/2009 |
| CN | 101359210 A | 2/2009 |
| CN | 101396910 A | 4/2009 |
| CN | 101508200 A | 8/2009 |
| CN | 101519007 A | 9/2009 |
| CN | 101524916 A | 9/2009 |
| CN | 101544100 A | 9/2009 |
| CN | 101544101 A | 9/2009 |
| CN | 101607468 A | 12/2009 |
| CN | 201410787 Y | 2/2010 |
| CN | 101835611 A | 9/2010 |
| CN | 101835612 A | 9/2010 |
| CN | 101873982 A | 10/2010 |
| CN | 102229294 A | 11/2011 |
| CN | 102248776 A | 11/2011 |
| CN | 102300932 A | 12/2011 |
| CN | 102555450 A | 7/2012 |
| CN | 102648095 A | 8/2012 |
| CN | 102925002 A | 2/2013 |
| CN | 103045008 A | 4/2013 |
| CN | 103309213 A | 9/2013 |
| CN | 103568483 A | 2/2014 |
| CN | 103627337 A | 3/2014 |
| CN | 103991293 A | 8/2014 |
| CN | 104220934 A | 12/2014 |
| CN | 104271356 A | 1/2015 |
| CN | 104284850 A | 1/2015 |
| CN | 104618642 A | 5/2015 |
| CN | 105058999 A | 11/2015 |
| CN | 107111267 A | 8/2017 |
| DE | 102010060999 A1 | 6/2012 |
| EP | 0457551 A2 | 11/1991 |
| EP | 0499857 A1 | 8/1992 |
| EP | 0606490 A1 | 7/1994 |
| EP | 0609076 A2 | 8/1994 |

(56) References Cited

FOREIGN PATENT DOCUMENTS

| | | |
|---|---|---|
| EP | 0613791 A2 | 9/1994 |
| EP | 0676300 A2 | 10/1995 |
| EP | 0530627 B1 | 3/1997 |
| EP | 0784244 A2 | 7/1997 |
| EP | 0835762 A1 | 4/1998 |
| EP | 0843236 A2 | 5/1998 |
| EP | 0854398 A2 | 7/1998 |
| EP | 1013466 A2 | 6/2000 |
| EP | 1146090 A2 | 10/2001 |
| EP | 1158029 A1 | 11/2001 |
| EP | 0825029 B1 | 5/2002 |
| EP | 1247821 A2 | 10/2002 |
| EP | 1271263 A1 | 1/2003 |
| EP | 0867483 B1 | 6/2003 |
| EP | 0923007 B1 | 3/2004 |
| EP | 1454968 A1 | 9/2004 |
| EP | 1503326 A1 | 2/2005 |
| EP | 1777243 A1 | 4/2007 |
| EP | 2028238 A1 | 2/2009 |
| EP | 2042317 A1 | 4/2009 |
| EP | 2065194 A2 | 6/2009 |
| EP | 2228210 A1 | 9/2010 |
| EP | 2270070 A1 | 1/2011 |
| EP | 2042318 B1 | 2/2011 |
| EP | 2042325 B1 | 2/2012 |
| EP | 2634010 A1 | 9/2013 |
| EP | 2683556 A1 | 1/2014 |
| EP | 2075635 B1 | 10/2014 |
| EP | 3260486 A1 | 12/2017 |
| EP | 2823363 B1 | 10/2018 |
| GB | 748821 A | 5/1956 |
| GB | 1496016 A | 12/1977 |
| GB | 1520932 A | 8/1978 |
| GB | 1522175 A | 8/1978 |
| GB | 2321430 A | 7/1998 |
| JP | S5578904 A | 6/1980 |
| JP | S57121446 U | 7/1982 |
| JP | S6076343 A | 4/1985 |
| JP | S60199692 A | 10/1985 |
| JP | S6223783 A | 1/1987 |
| JP | H03248170 A | 11/1991 |
| JP | H05147208 A | 6/1993 |
| JP | H05192871 A | 8/1993 |
| JP | H05297737 A | 11/1993 |
| JP | H06954 A | 1/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H09123432 A | 5/1997 |
| JP | H09157559 A | 6/1997 |
| JP | H09281851 A | 10/1997 |
| JP | H09300678 A | 11/1997 |
| JP | H09314867 A | 12/1997 |
| JP | H1142811 A | 2/1999 |
| JP | H11503244 A | 3/1999 |
| JP | H11106081 A | 4/1999 |
| JP | H11138740 A | 5/1999 |
| JP | H11245383 A | 9/1999 |
| JP | 2000108320 A | 4/2000 |
| JP | 2000108334 A | 4/2000 |
| JP | 2000141710 A | 5/2000 |
| JP | 2000168062 A | 6/2000 |
| JP | 2000169772 A | 6/2000 |
| JP | 2000206801 A | 7/2000 |
| JP | 2000343025 A | 12/2000 |
| JP | 2001088430 A | 4/2001 |
| JP | 2001098201 A | 4/2001 |
| JP | 2001139865 A | 5/2001 |
| JP | 3177985 B2 | 6/2001 |
| JP | 2001164165 A | 6/2001 |
| JP | 2001199150 A | 7/2001 |
| JP | 2001206522 A | 7/2001 |
| JP | 2002020666 A | 1/2002 |
| JP | 2002049211 A | 2/2002 |
| JP | 2002504446 A | 2/2002 |
| JP | 2002069346 A | 3/2002 |
| JP | 2002103598 A | 4/2002 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002304066 A | 10/2002 |
| JP | 2002326733 A | 11/2002 |
| JP | 2002371208 A | 12/2002 |
| JP | 2003057967 A | 2/2003 |
| JP | 2003094795 A | 4/2003 |
| JP | 2003114558 A | 4/2003 |
| JP | 2003145914 A | 5/2003 |
| JP | 2003183557 A | 7/2003 |
| JP | 2003211770 A | 7/2003 |
| JP | 2003219271 A | 7/2003 |
| JP | 2003246135 A | 9/2003 |
| JP | 2003246484 A | 9/2003 |
| JP | 2003292855 A | 10/2003 |
| JP | 2003313466 A | 11/2003 |
| JP | 2004009632 A | 1/2004 |
| JP | 2004011263 A | 1/2004 |
| JP | 2004019022 A | 1/2004 |
| JP | 2004025708 A | 1/2004 |
| JP | 2004034441 A | 2/2004 |
| JP | 2004077669 A | 3/2004 |
| JP | 2004114377 A | 4/2004 |
| JP | 2004114675 A | 4/2004 |
| JP | 2004148687 A | 5/2004 |
| JP | 2004167902 A | 6/2004 |
| JP | 2004231711 A | 8/2004 |
| JP | 2004524190 A | 8/2004 |
| JP | 2004261975 A | 9/2004 |
| JP | 2004325782 A | 11/2004 |
| JP | 2004340983 A | 12/2004 |
| JP | 2005014255 A | 1/2005 |
| JP | 2005014256 A | 1/2005 |
| JP | 2005114769 A | 4/2005 |
| JP | 2005215247 A | 8/2005 |
| JP | 2005307184 A | 11/2005 |
| JP | 2005319593 A | 11/2005 |
| JP | 2006001688 A | 1/2006 |
| JP | 2006023403 A | 1/2006 |
| JP | 2006095870 A | 4/2006 |
| JP | 2006102975 A | 4/2006 |
| JP | 2006137127 A | 6/2006 |
| JP | 2006143778 A | 6/2006 |
| JP | 2006152133 A | 6/2006 |
| JP | 2006224583 A | 8/2006 |
| JP | 2006231666 A | 9/2006 |
| JP | 2006234212 A | 9/2006 |
| JP | 2006243212 A | 9/2006 |
| JP | 2006263984 A | 10/2006 |
| JP | 2006347081 A | 12/2006 |
| JP | 2006347085 A | 12/2006 |
| JP | 2007025246 A | 2/2007 |
| JP | 2007041530 A | 2/2007 |
| JP | 2007069584 A | 3/2007 |
| JP | 2007079159 A | 3/2007 |
| JP | 2007083445 A | 4/2007 |
| JP | 2007190745 A | 8/2007 |
| JP | 2007216673 A | 8/2007 |
| JP | 2007253347 A | 10/2007 |
| JP | 2007334125 A | 12/2007 |
| JP | 2008006816 A | 1/2008 |
| JP | 2008018716 A | 1/2008 |
| JP | 2008019286 A | 1/2008 |
| JP | 2008036968 A | 2/2008 |
| JP | 2008137146 A | 6/2008 |
| JP | 2008137239 A | 6/2008 |
| JP | 2008139877 A | 6/2008 |
| JP | 2008142962 A | 6/2008 |
| JP | 2008183744 A | 8/2008 |

(56) References Cited

FOREIGN PATENT DOCUMENTS

| | | |
|---|---|---|
| JP | 2008194997 A | 8/2008 |
| JP | 2008532794 A | 8/2008 |
| JP | 2008201564 A | 9/2008 |
| JP | 2008238674 A | 10/2008 |
| JP | 2008246787 A | 10/2008 |
| JP | 2008246990 A | 10/2008 |
| JP | 2008254203 A | 10/2008 |
| JP | 2008255135 A | 10/2008 |
| JP | 2009040892 A | 2/2009 |
| JP | 2009045794 A | 3/2009 |
| JP | 2009045851 A | 3/2009 |
| JP | 2009045885 A | 3/2009 |
| JP | 2009083314 A | 4/2009 |
| JP | 2009083317 A | 4/2009 |
| JP | 2009083325 A | 4/2009 |
| JP | 2009096175 A | 5/2009 |
| JP | 2009148908 A | 7/2009 |
| JP | 2009154330 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009532240 A | 9/2009 |
| JP | 2009226805 A | 10/2009 |
| JP | 2009226852 A | 10/2009 |
| JP | 2009226886 A | 10/2009 |
| JP | 2009226890 A | 10/2009 |
| JP | 2009233977 A | 10/2009 |
| JP | 2009234219 A | 10/2009 |
| JP | 2010005815 A | 1/2010 |
| JP | 2010030300 A | 2/2010 |
| JP | 2010054855 A | 3/2010 |
| JP | 2010510357 A | 4/2010 |
| JP | 2010105365 A | 5/2010 |
| JP | 2010173201 A | 8/2010 |
| JP | 2010184376 A | 8/2010 |
| JP | 2010214885 A | 9/2010 |
| JP | 4562388 B2 | 10/2010 |
| JP | 2010228192 A | 10/2010 |
| JP | 2010228392 A | 10/2010 |
| JP | 2010234599 A | 10/2010 |
| JP | 2010234681 A | 10/2010 |
| JP | 2010240897 A | 10/2010 |
| JP | 2010241073 A | 10/2010 |
| JP | 2010247381 A | 11/2010 |
| JP | 2010247528 A | 11/2010 |
| JP | 2010258193 A | 11/2010 |
| JP | 2010260204 A | 11/2010 |
| JP | 2010260287 A | 11/2010 |
| JP | 2010260302 A | 11/2010 |
| JP | 2010286570 A | 12/2010 |
| JP | 2011002532 A | 1/2011 |
| JP | 2011025431 A | 2/2011 |
| JP | 2011031619 A | 2/2011 |
| JP | 2011037070 A | 2/2011 |
| JP | 2011064850 A | 3/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 2011523601 A | 8/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012086499 A | 5/2012 |
| JP | 2012111194 A | 6/2012 |
| JP | 2012126123 A | 7/2012 |
| JP | 2012139905 A | 7/2012 |
| JP | 2012196787 A | 10/2012 |
| JP | 2012201419 A | 10/2012 |
| JP | 2013001081 A | 1/2013 |
| JP | 2013060299 A | 4/2013 |
| JP | 2013103474 A | 5/2013 |
| JP | 2013121671 A | 6/2013 |
| JP | 2013129158 A | 7/2013 |
| JP | 2014047005 A | 3/2014 |
| JP | 2014094827 A | 5/2014 |
| JP | 2014131843 A | 7/2014 |
| JP | 2016093999 A | 5/2016 |
| JP | 2016185688 A | 10/2016 |
| JP | 2016539830 A | 12/2016 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9401283 A1 | 1/1994 |
| WO | WO-9604339 A1 | 2/1996 |
| WO | WO-9631809 A1 | 10/1996 |
| WO | WO-9707991 A1 | 3/1997 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0064685 A1 | 11/2000 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2004113450 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | WO-2010042784 A3 | 4/2010 |
| WO | WO-2010073916 A1 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |
| WO | WO-2013132356 A1 | 9/2013 |
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | WO-2015036864 A1 | 3/2015 |
| WO | WO-2015036906 A2 | 3/2015 |
| WO | WO-2015036960 A1 | 3/2015 |
| WO | WO-2016166690 A1 | 10/2016 |
| WO | WO-2017208155 A1 | 12/2017 |
| WO | WO-2017208246 A1 | 12/2017 |
| WO | 2018100541 A1 | 6/2018 |

OTHER PUBLICATIONS

BASF, "JONCRYL 537", Datasheet, Retrieved from the internet: Mar. 23, 2007 p. 1.

Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/ 4352D0BC052E90CEC1257479002707D9/$FILE/DP6208E_0608_ FL_Hostafinefordesignandcreativematerials.pdf].

(56) References Cited

OTHER PUBLICATIONS

CN101073937A Machine Translation (by EPO and Google)—published Nov. 21, 2007; Werner Kaman Maschinen Gmbh & [DE].
CN101177057 Machine Translation (by EPO and Google)—published May 14, 2008—Hangzhou Yuanyang Industry Co.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK[JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics Co Ltd.
CN102300932A Machine Translation (by EPO and Google)—published Dec. 28, 2011; Yoshida Hiroaki et al.
CN102648095A Machine Translation (by EPO and Google)—published Aug. 22, 2012; Mars Inc.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox Co Ltd.
CN103627337A Machine Translation (by EPO and Google)—published Mar. 12, 2014; Suzhou Banlid New Material Co Ltd.
CN103991293A Machine Translation (by EPO and Google)—published Aug. 20, 2014; Miyakoshi Printing Machinery Co., Ltd, Junichi et al.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology Co Ltd.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].
CN1493514A Machine Translation (by EPO and Google)—published May 5, 2004; GD Spa, Boderi et al.
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
CN1809460A Machine Translation (by EPO and Google)—published Jul. 26, 2006; Canon KK.
CN201410787Y Machine Translation (by EPO and Google)—published Feb. 24, 2010; Zhejiang Chanx Wood Co Ltd.
Co-pending U.S. Appl. No. 16/512,915, inventor Vitaly; Burkatovsky, filed Jul. 16, 2019.
Co-pending U.S. Appl. No. 16/590,397, filed Oct. 2, 2019.
Co-pending U.S. Appl. No. 16/764,330, filed May 14, 2020.
Co-pending U.S. Appl. No. 16/767,631, inventor Levanon; Moshe, filed May 28, 2020.
Co-pending U.S. Appl. No. 16/921,736, filed Jul. 7, 2020.
Co-pending U.S. Appl. No. 17/014,525, inventor Benzion; Landa, filed Sep. 8, 2020.
Co-pending U.S. Appl. No. 17/068,088, inventor Benzion; Landa, filed Oct. 12, 2020.
Co-pending U.S. Appl. No. 17/088,257, filed Nov. 3, 2020.
Co-pending U.S. Appl. No. 17/252,747, filed Dec. 16, 2020.
DE102010060999 Machine Translation (by EPO and Google)—published Jun. 6, 2012; Wolf, Roland, Dr.-Ing.
Epomin Polymert, product information from Nippon Shokubai, dated Feb. 28, 2014.
Flexicon., "Bulk Handling Equipment and Systems: Carbon Black," 2018, 2 pages.
Handbook of Print Media, 2001, Springer Verlag, Berlin/Heidelberg/New York, pp. 127-136,748—With English Translation.
IP.com Search, 2018, 2 pages.
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother Ind Ltd.
JP2000141710A Machine Translation (by EPO and Google)—published May 23, 2000; Brother Ind Ltd.
JP2000168062A Machine Translation (by EPO and Google)—published Jun. 20, 2000; Brother Ind Ltd.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; PFU Ltd.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical Co.
JP2002169383 Machine Translation (by EPO, PlatPat and Google)—published Jun. 14, 2002 Ricoh KK.
JP2002234243 Machine Translation (by EPO and Google)—published Aug. 20, 2002; Hitachi Koki Co Ltd.
JP2002278365 Machine Translation (by PlatPat English machine translation)—published Sep. 27, 2002 Katsuaki, Ricoh KK.
JP2002304066A Machine Translation (by EPO and Google)—published Oct. 18, 2002; PFU Ltd.
JP2002326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003114558 Machine Translation (by EPO, PlatPat and Google)—published Apr. 18, 2003 Mitsubishi Chem Corp, Yuka Denshi Co Ltd, et al.
JP2003145914A Machine Translation (by EPO and Google)—published May 21, 2003; Konishiroku Photo Ind.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo Ind.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings Inc.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings Inc.
JP2004034441A Machine Translation (by EPO and Google)—published Feb. 5, 2004; Konica Minolta Holdings Inc.
JP2004077669 Machine Translation (by PlatPat English machine translation)—published Mar. 11, 2004 Fuji Xerox Co Ltd.

(56) References Cited

OTHER PUBLICATIONS

JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy Ind Ltd.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2004325782A Machine Translation (by EPO and Google)—published Nov. 18, 2004; Canon KK.
JP2004524190A Machine Translation (by EPO and Google)—published Aug. 12, 2004; Avery Dennison Corp.
JP2005014255 Machine Translation (by EPO and Google)—published Jan. 20, 2005; Canon Inc.
JP2005014256 Machine Translation (by EPO and Google)—published Jan. 20, 2005; Canon Inc.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film Co Ltd.
JP2006102975 Machine Translation (by EPO and Google)—published Apr. 20, 2006; Fuji Photo Film Co Ltd.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2006234212A Machine Translation (by EPO and Google)—published Sep. 7, 2006; Matsushita Electric Ind Co Ltd.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.
JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson Corp.
JP2007041530A Machine Translation (by EPO and Google)—published Feb. 15, 2007; Fuji Xerox Co Ltd.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007083445A Machine Translation (by EPO and Google)—published Apr. 5, 2007; Fujifilm Corp.
JP2007216673 Machine Translation (by EPO and Google)—published Aug. 30, 2007 Brother Ind.
JP2007253347A Machine Translation (by EPO and Google)—published Oct. 4, 2007; Ricoh KK, Matsuo et al.
JP2008006816 Machine Translation (by EPO and Google)—published Jan. 17, 2008; Fujifilm Corp.
JP2008018716 Machine Translation (by EPO and Google)—published Jan. 31, 2008; Canon Inc.
JP2008137239A Machine Translation (by EPO and Google); published on Jun. 19, 2008, Kyocera Mita Corp.
JP2008139877A Machine Translation (by EPO and Google)—published Jun. 19, 2008; Xerox Corp.
JP2008142962 Machine Translation (by EPO and Google)—published Jun. 26, 2008; Fuji Xerox Co Ltd.
JP2008183744A Machine Translation (by EPO and Google)—published Aug. 14, 2008, Fuji Xerox Co Ltd.
JP2008194997A Machine Translation (by EPO and Google)—published Aug. 28, 2008; Fuji Xerox Co Ltd.
JP2008201564 Machine Translation (English machine translation)—published Sep. 4, 2008 Fuji Xerox Co Ltd.
JP2008238674A Machine Translation (by EPO and Google)—published Oct. 9, 2008; Brother Ind Ltd.
JP2008246990 Machine Translation (by EPO and Google)—published Oct. 16, 2008, Jujo Paper Co Ltd.
JP2008254203A Machine Translation (by EPO and Google)—published Oct. 23, 2008; Fujifilm Corp.
JP2008255135 Machine Translation (by EPO and Google)—published Oct. 23, 2008; Fujifilm Corp.
JP2009045794 Machine Translation (by EPO and Google)—published Mar. 5, 2009; Fujifilm Corp.
JP2009045851A Machine Translation (by EPO and Google); published on Mar. 5, 2009, Fujifilm Corp.
JP2009045885A Machine Translation (by EPO and Google)—published Mar. 5, 2009; Fuji Xerox Co Ltd.
JP2009083314 Machine Translation (by EPO, PlatPat and Google)—published Apr. 23, 2009 Fujifilm Corp.
JP2009083317 Abstract; Machine Translation (by EPO and Google)—published Apr. 23, 2009; Fuji Film Corp.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm Corp.
JP2009148908A Machine Translation (by EPO and Google)—published Jul. 9, 2009; Fuji Xerox Co Ltd.
JP2009154330 Machine Translation (by EPO and Google)—published Jul. 16, 2009; Seiko Epson Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009226852 Machine Translation (by EPO and Google)—published Oct. 8, 2009; Hirato Katsuyuki, Fujifilm Corp.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm Corp.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper Co Ltd.
JP2010234599A Machine Translation (by EPO and Google)—published Oct. 21, 2010; Duplo Seiko Corp et al.
JP2010234681A Machine Translation (by EPO and Google)—published Oct. 21, 2010; Riso Kagaku Corp.

(56) References Cited

OTHER PUBLICATIONS

JP2010241073 Machine Translation (by EPO and Google)—published Oct. 28, 2010; Canon Inc.
JP2010247381A Machine Translation (by EPO and Google); published on Nov. 4, 2010, Ricoh Co Ltd.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon KK.
JP2010260302A Machine Translation (by EPO and Google)—published Nov. 18, 2010; Riso Kagaku Corp.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011037070A Machine Translation (by EPO and Google)—published Feb. 24, 2011; Riso Kagaku Corp.
JP2011067956A Machine Translation (by EPO and Google)—published Apr. 7, 2011; Fuji Xerox Co Ltd.
JP2011126031A Machine Translation (by EPO and Google); published on Jun. 30, 2011, Kao Corp.
JP2011144271 Machine Translation (by EPO and Google)—published Jun. 28, 2011 Toyo Ink SC Holdings Co Ltd.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon KK.
JP2011201951A Machine Translation (by PlatPat English machine translation); published on Oct. 13, 2011, Shin-Etsu Chemical Co Ltd, Todoroki et al.
JP2011224032 Machine Translation (by EPO & Google)—published Nov. 10, 2011, Mameita KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson Corp.
JP2012201419A Machine Translation (by EPO and Google)—published Oct. 22, 2012, Seiko Epson Corp.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.
JP2013103474 Machine Translation (by EPO and Google)—published May 30, 2013; Ricoh Co Ltd.
JP2013121671 Machine Translation (by EPO and Google)—published Jun. 20, 2013; Fuji Xerox Co Ltd.
JP2013129158 Machine Translation (by EPO and Google)—published Jul. 4, 2013: Fuji Xerox Co Ltd.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2014131843A Machine Translation (by EPO and Google)—published Jul. 17, 2014; Ricoh Co Ltd.
JP2016185688A Machine Translation (by EPO and Google)—published Oct. 27, 2016; Hitachi Industry Equipment Systems Co Ltd.
JP2529651B2 Machine Translation (by EPO and Google)—issued Aug. 28, 1996;Osaka Sealing Insatsu KK.
JPH03248170A Machine Translation (by EPO & Google)—published Nov. 6, 1991; Fujitsu Ltd.
JPH05147208 Machine Translation (by EPO and Google)—published Jun. 15, 1993—Mita Industrial Co Ltd.
JPH06100807 Machine Translation (by EPO and Google)—published Apr. 12, 1994; Seiko Instr Inc.
JPH06171076A Machine Translation (by PlatPat English machine translation)—published Jun. 21, 1994, Seiko Epson Corp.
JPH06345284A Machine Translation (by EPO and Google); published on Dec. 20, 1994, Seiko Epson Corp.
JPH06954A Machine Translation (by EPO and Google)—published Jan. 11, 1994; Seiko Epson Corp.
JPH07186453A Machine Translation (by EPO and Google)—published Jul. 25, 1995; Toshiba Corp.
JPH07238243A Machine Translation (by EPO and Google)—published Sep. 12, 1995; Seiko Instr Inc.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial Co Ltd.
JPH09157559A Machine Translation (by EPO and Google)—published Jun. 17, 1997; Toyo Ink Mfg Co.
JPH09281851A Machine Translation (by EPO and Google)—published Oct. 31, 1997; Seiko Epson Corp.
JPH09314867A Machine Translation (by PlatPat English machine translation)—published Dec. 9, 1997, Toshiba Corp.
JPH11106081A Machine Translation (by EPO and Google)—published Apr. 20, 1999; Ricoh KK.
JPH11245383A Machine Translation (by EPO and Google)—published Sep. 14, 1999; Xerox Corp.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987: Canon KK.
Larostat 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityoflhings.com/water/alcohol; downloaded on Nov. 30, 2017.
Poly(vinyl acetate) data sheet. PolymerProcessing.com. Copyright 2010. http://polymerprocessing .com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; ZAO Rezinotekhnika.
RU2282643C1 Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Furia, T.E., "CRC Handbook of Food Additives, Second Edition, vol. 1" CRC Press LLC, 1972, p. 434.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.

(56) References Cited

OTHER PUBLICATIONS

WO2013087249 Machine Translation (by EPO and Google)—published Jun. 20, 2013; Koenig & Bauer AG.
CN103568483A Machine Translation (by EPO and Google)—published Feb. 12, 2014; Anhui Printing Mechanical & Electrical Co Ltd.
CN107111267A Machine Translation (by EPO and Google)—published Aug. 29, 2017; Hewlett Packard Indigo BV.
Co-Pending U.S. Appl. No. 17/155,121, filed Jan. 22, 2021.
Co-Pending U.S. Appl. No. 17/312,394, inventors Benzion; Landa et al., filed Jun. 10, 2021.
Co-Pending U.S. Appl. No. 17/382,285, filed Jul. 21, 2021.
Co-Pending U.S. Appl. No. 17/382,334, inventor Landa; Benzion, filed Jul. 21, 2021.
Co-Pending U.S. Appl. No. 17/414,087, inventors Benzion; Landa et al., filed Jun. 15, 2021.
Co-Pending U.S. Appl. No. 17/438,497, filed Sep. 13, 2021.
Co-Pending U.S. Appl. No. 17/507,758, filed Oct. 21, 2021.
IP.com search (Year: 2021).
JP2000343025A Machine Translation (by EPO and Google)—published Dec. 12, 2000; Kyocera Corp.
JP2003094795A Machine Translation (by EPO and Google)—published Apr. 3, 2003; Ricoh KK.
JP2004011263A Machine Translation (by EPO and Google)—published Jan. 15, 2004; Sumitomo Denko Steel Wire KK.
JP2004167902A Machine Translation (by EPO and Google)—published Jun. 17, 2004; Nippon New Chrome KK.
JP2004340983A Machine Translation (by EPO and Google)—published Dec. 2, 2004; Ricoh KK.
JP2008137146A Machine Translation (by EPO and Google)—published Jun. 19, 2008; CBG Acciai SRL.
JP2009226805A Machine Translation (by EPO and Google)—published Oct. 8, 2009; Fuji Xerox Co Ltd.
JP2009226890A Machine Translation (by EPO and Google)—published Oct. 8, 2009; Fuji Xerox Co Ltd.
JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2010240897A Machine Translation (by EPO and Google)—published Oct. 28, 2010; Toppan Printing Co Ltd.
JP2011031619A Machine Translation (by EPO and Google)—published Feb. 17, 2011; Xerox Corp.
JP2011064850A Machine Translation (by EPO and Google)—published Mar. 31, 2011; Seiko Epson Corp.
JP2016093999A Machine Translation (by EPO and Google)—published May 26, 2016; Canon KK.
JP4562388B2 Machine Translation (by EPO and Google)—published Oct. 13, 2010; SK Kaken Co Ltd.
JPH09300678A Machine Translation (by EPO and Google)—published Nov. 25, 1997; Mitsubishi Electric Corp.
JPH11138740A Machine Translation (by EPO and Google)—published May 25, 1999; Nikka KK.
Xiameter™ "OFS-0777 Siliconate Technical Data Sheet," Dec. 31, 2017, 5 pages. [Retrieved from the internet on Oct. 13, 2021]: https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.

* cited by examiner

CORRECTING REGISTRATION ERRORS IN DIGITAL PRINTING

CROSS-REFERENCE TO RELATED APPLICATIONS

This application claims the benefit of U.S. Provisional Patent Application 62/946,455, filed Dec. 11, 2019, whose disclosure is incorporated herein by reference.

FIELD OF THE INVENTION

The present invention relates generally to digital printing, and particularly to methods and systems for estimating and correcting registration errors in printing of a digital image.

BACKGROUND OF THE INVENTION

Various techniques for correcting registration errors in printing processes have been published.

For example, U.S. Patent Application Publication 2016/0325542 describes a method for registering a printing press including a plurality of printing stations each for printing a respective color-image on a web, each of the printing stations being associated with a respective different color, at least two pairs of the printing stations being un-registered. The method includes the procedures of identifying at least two regions-of-interest in the image to be printed, chromatically separating the acquired image to determine two monochrome images, and determining a registration correction for each printing station according to the registration between the monochrome images.

U.S. Pat. No. 9,503,613 describes methods and devices for print markings on an item in a first printing pass, using intended locations for the markings, to produce initial printed marks. Such methods and devices further scan the item after the first printing pass to detect actual printed locations of the initial printed marks. These methods and devices also compare the actual printed locations to the intended locations to identify the printing registration variation.

U.S. Patent Application Publication 2014/0146370 describes an image registration method to register a target image with a reference image. The method includes determining a target set of features present in the target image, determining a reference set of features present in the reference image, generating respective signatures for each feature in the target and reference sets, matching features from the target set to corresponding features in the reference set using the signatures, generating respective transformations to map pairs of features in the target set to corresponding pairs of features in the reference set, and determining a similarity transformation for the target image using a measure of the accuracy of the transformations.

SUMMARY OF THE INVENTION

An embodiment of the present invention that is described herein provides a method for correcting an error in image printing, the method including receiving a reference digital image (RDI). Based on a predefined selection criterion, one or more regions in the RDI that are suitable for use as anchor features for sensing the error, are selected. A digital image (DI) acquired from a printed image of the RDI, is received and the one or more regions are identified in the DI. Based on the anchor features of the DI, the error is estimated in the printed image. A correction that, when applied to the DI, compensates for the estimated error, is calculated. The estimated error is corrected in a subsequent digital image (SDI) to be printed, and the SDI having the corrected error, is printed.

In some embodiments, the error includes a registration error, and selecting the one or more regions includes producing multiple versions of the RDI having respective registration errors. In other embodiments, producing the multiple versions includes applying to at least part of at least one of the regions, one or more errors selected from a list consisting of: (a) flipping in one or more axes, (b) rotating in one or more axes, (c) image blurring, and (d) adding noise, and selecting the one or more regions includes training a neural network using the multiple versions. In yet other embodiments, estimating the error includes training a neural network to detect the error in the one or more regions, and training the neural network includes producing multiple versions of the RDI having respective errors.

In an embodiment, the error includes a registration error, and training the neural network includes comparing, in a selected region, between a predefined registration error produced in the selected region, and an output registration error estimated by the neural network, and applying, to the predefined and the output registration errors, a loss function, and comparing an output of the loss function to a threshold. In another embodiment, the RDI includes at least a first reference color image (RCI) having a first color, and a second RCI having a second color, and producing the multiple versions includes shifting, in the region, at least part of the first RCI relative to the second RCI. In yet another embodiment, training the neural network includes training a multi-layered convolutional neural network including at least five layers.

In some embodiments, the error includes a registration error, and estimating the registration error includes estimating an image-to-substrate (ITS) registration error by (i) measuring, in the RDI, a distance between at least one of the anchor features and a given region at an edge of the printed image, and (ii) estimating, in the printed image of the DI, a variation of the distance. In other embodiments, the error includes a registration error, each of the RDI and DI includes at least first and second colors, and estimating the registration error includes estimating, in at least one of the regions of the DI, a color-to-color (CTC) registration error between the first and second colors by (i) measuring, in at least one of the regions of the RDI image, a given distance between the first color and the second color, and (ii) estimating, in the printed image of the DI, a variation of the given distance. In yet other embodiments, the error includes at least one of: (a) a shift of a given pattern of the printed image relative to a position of the given pattern in the RDI, (b) a missing pattern, (c) a non-uniform thickness of a pattern in the printed image, (d) a non-uniform width of the pattern in the printed image, (e) a deviation in a profile of one or more colors of the printed image, and (f) a deviation in a linearity of one or more colors of the printed image.

There is additionally provided, in accordance with an embodiment of the present invention, a system for correcting an error in image printing, the system includes a processor and a printing subsystem. The processor is configured to: receive a reference digital image (RDI), select, based on a predefined selection criterion, one or more regions in the RDI that are suitable for use as anchor features for sensing the error, receive a digital image (DI) acquired from a printed image of the RDI, and identify the one or more regions in the DI, estimate, based on the anchor features of the DI, the error in the printed image, calculate a correction that, when applied to the DI, compensates for the estimated error, and correct the estimated error in a subsequent digital image (SDI) to be printed. The printing subsystem is configured to print the SDI having the corrected error.

The present invention will be more fully understood from the following detailed description of the embodiments thereof, taken together with the drawings in which:

DETAILED DESCRIPTION OF EMBODIMENTS

Overview

Figure 1:
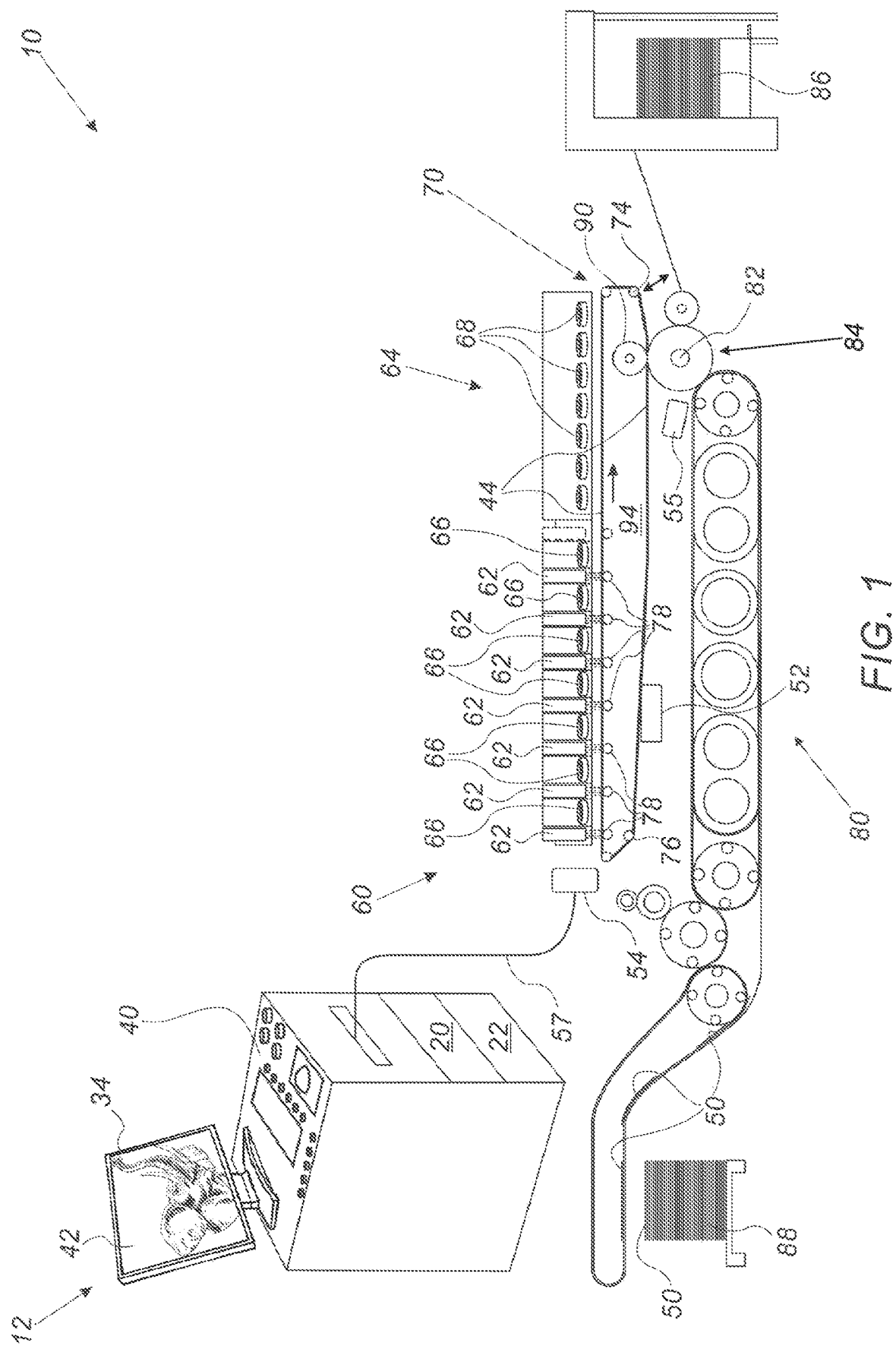
FIG. 1 is a schematic side view of a digital printing system, in accordance with an embodiment of the present invention.

Digital printing processes may cause various types of registration errors in an image printed on a target substrate. In principle, it is possible to implement, in a digital image to be printed, registration targets for measuring registration errors in the printed version of the image. Such registration targets, however, are typically limited to the edge of the target substrate, and therefore, may not be indicative of registration errors within the printed image.

Embodiments of the present invention that are described hereinbelow provide improved techniques for estimating and correcting registration errors in printing of a digital image on a target substrate. In some embodiments, a digital printing system comprises a processor and a printing subsystem.

In some embodiments, the processor is configured to receive a reference digital image (RDI) to be printed using the printing subsystem. The processor is configured to select, based on a predefined selection criterion, one or more regions, also referred to herein as patches, in the RDI that are suitable for use as anchor features for sensing various types of registration errors.

In some embodiments, the processor is configured to receive a digital image (DI) acquired from a printed image of the RDI, to identify the patches in the DI, and to estimate, based on the anchor features of the DI, one or more of the registration errors in the printed image. Subsequently, the processor is configured to calculate a correction that, when applied to the DI, compensates for the estimated registration errors, and to correct the estimated registration error in a subsequent digital image (SDI) to be printed. In some embodiments, the printing subsystem configured to print the SDI having the corrected registration error.

In some embodiments, the system may comprise a multilayered convolutional neural network (CNN), and the processor is configured to produce multiple versions of the RDI having respective registration errors, referred to herein as ground truth, serving as an input for the CNN. The processor may add to the registration errors, augmented errors, such as rotating, flipping and blurring of at least part of the selected patch and anchor feature. Subsequently, the processor is configured to train the CNN to estimate the registration errors using the ground truth input. Note that the aforementioned augmentation may improve the robustness of the trained CNN.

In some embodiments, the RDI and DIs comprise multiple color images of respective colors, and the registration error comprises a color-to-color (CTC) registration error between at least two of the aforementioned colors, referred to herein as first and second colors. In such embodiments, the processor is configured to apply the CNN to measure, in a selected position of at least one of the patches of the RDI image, a given distance between the first color and the second color, and to estimate, in the printed image of the DI, a variation of the given distance.

In some embodiments, the CNN is configured to receive an input image of a patch having about 10,000 red-green-blue (RGB) pixels, to apply to the input image multiple convolutional layers (e.g., five layers), and to output a fully-connected neural network layer having multiple outputs indicative of the respective registration error of each printed color in x and y axes of the printed image. For example, the printed image may comprise cyan, magenta, yellow and black (CMYK) color images arranged on the target substrate to form the RGB image. In this example, the fully-connected neural network layer may comprise eight outputs, two for each color image.

In some embodiments, during the training of the CNN, the processor is configured to compare between the output of the CNN and the ground truth input, using a loss function. The processor may hold a threshold indicative of the qualification level of the CNN to estimate the registration error in the respective patch. If the output of the loss function is smaller than the threshold, the CNN is qualified for estimating registration errors in the respective patch. Alternatively, if the output of the loss function is larger than the threshold, the processor may train the CNN with additional versions of the respective patch. Note that the training process is iterative, so that the processor may measure the training efficiency by the number of iterations required to qualify the CNN.

The disclosed techniques improve the quality of printed digital images by correcting a large variety of registration errors. Moreover, the disclosed techniques reduce waste of substrate and ink by improving the yield of the printed substrates.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown) or as an "image" for brevity, of a digital image 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan (C), magenta (M), yellow (Y) and black (K).

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66 and/or infrared (IR) heaters or and other suitable type of heaters adapted for the printing application. In the example of FIG. 1, air blowers 66 are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 are configured to receive the signals produced by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose computer, with suitable front end and interface circuits for interfacing with controllers of dancer assembly 74 and with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS)

image sensor, and a scanner comprising a slit having a width of about one meter or any other suitable width.

In the context of the present disclosure and in the claims, the terms "about" or "approximately" for any numerical values or ranges indicate a suitable dimensional tolerance that allows the part or collection of components to function for its intended purpose as described herein. For example, "about" or "approximately" may refer to the range of values ±20% of the recited value, e.g. "about 90%" may refer to the range of values from 72% to 100%.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images (and a test pattern if available), so as to monitor various attributes, such as but not limited to full image registration with sheet 50, color-to-color (CTC) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to the printed image, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to analyze the signals acquired by station 55 so as to monitor the nozzles of image forming station 60. By printing the digital image and/or a test pattern of each color of image forming station 60, processor 20 is configured to identify various types of defects indicative of malfunctions in the operation of the respective nozzles.

For example, absence of ink in a designated location in the printed image is indicative of a missing or blocked nozzle. A partially blocked nozzle may result in a distorted pattern. A shift of a printed pattern (relative to the original design) is indicative of inaccurate positioning of a respective print bar 62 or of one or more nozzles of the respective print bar. Non-uniform thickness and/or width of a printed feature of the image is indicative of width differences between respective print bars 62, referred to above as bar to bar width delta.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Estimating and Correcting Registration Errors in Image Printing

Figure 2:
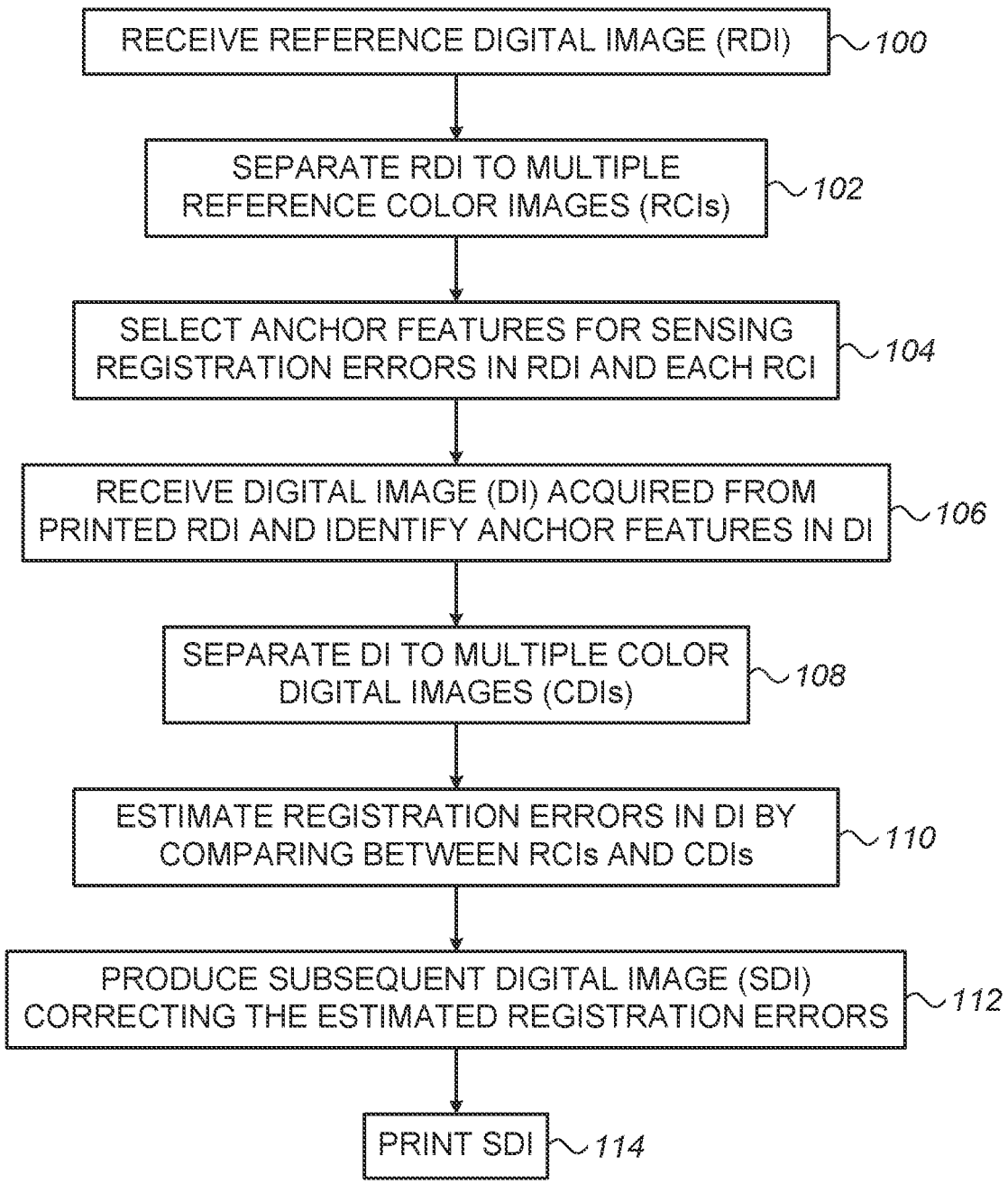
FIG. 2 is a flow chart that schematically shows a method for correcting registration errors in image printing, in accordance with an embodiment of the present invention.

FIG. 2 is a flow chart that schematically shows a method for correcting registration errors in image printing, in accordance with an embodiment of the present invention. For the sake of concreteness and clarity, the method of FIG. 2 is described hereinbelow with reference to the elements of system 10. The principles of this method, however, are not limited to this particular system configuration and can be applied, mutatis mutandis, in other sorts of printing systems (such as, but not limited to digital printing on continuous web substrate) that require detection and compensation of various types of registration errors.

The method begins at a step 100 with processor 20 receiving a reference digital image (RDI) to be printed on blanket 44 and subsequently transferred to sheet 50. Note that the RDI comprises multiple colors. At a step 102, processor 20 separates the RDI to multiple reference color images (RCIs) of the aforementioned colors. Note that the RDI may comprise a red-green-blue (RGB) image. In some embodiments, processor 20 is configured to convert the RGB image into a combination of colors (e.g., CMYK) supplied by system 10, and is further configured to separate the image to multiple (e.g., four) color images of the respective CMYK ink droplets supplied by print bars 62 as described in FIG. 1 above.

At a step 104 processor 20 selects, based on a predefined selection criterion, one or more regions in the RDI and in each RCI, which are suitable for use as candidate anchor features for sensing registration errors in the RDI and RCIs. In the context of the present disclosure and in the claims, the terms "region" and "patch" are used interchangeably and refer to an area in any digital image having one or more anchor features. The predefined selection criterion is further described in FIG. 3 below, and other methods for selecting the region containing anchor images are described in FIGS. 4-6 below.

In other embodiments, processor 20 is configured to select the regions having the anchor features in any type of digital image, such as but not limited to an image acquired from a printed image, or a digital image provided in any suitable format, such as but not limited to PDF file format.

At a step 106, processor 20 receives, e.g., from image quality control station 55, a digital image (DI) acquired from an image of the RDI, which is printed by system 10, and identifies in the DI, the one or more regions having the anchor features.

At a step 108, processor 20 separates the DI to multiple color digital images (CDIs) corresponding to the RCIs described in step 102 above. Note that step 108 may be used primarily for detecting color-to-color (CTC) registration errors as will be described in detail in FIGS. 4-6 below. In some embodiments, such as when only detection of an image-to-substrate (ITS) registration error is of interest, step 108 may be removed from the method. In other embodiments, step 108 may also be used for detecting ITS registration errors.

At a step 110, processor 20 may estimate, based on the anchor features of the DI, one or more registration errors, such as ITS, CTC and others, in the image printed by system 10. In some embodiments, processor 20 is configured to estimate the registration errors in the DI by comparing between the RCIs and the CDIs, or by comparing between the RDI and the DI.

In some embodiments, processor 20 is configured to estimate the ITS registration error by conducting measurements on the RDI and on the DI. In such embodiments, processor 20 is configured to measure, in the RDI, distances between one or more of the anchor features and a given region at an edge of the printed image. For example, the given region may be located at or constitute a corner of sheet 50. Subsequently, processor 20 is configured to measure, in the printed image of the DI, a variation of the distances that were measured in the RDI, between the anchor features and a given region. The estimation of registration errors is further described in FIG. 3 below.

At a step 112, processor 20 produces a subsequent digital image (SDI), which is based on the RDI and is correcting the registration errors estimated in the DI, as described in step 110 above.

At a step 114, processor 20 controls system 10 to print the SDI image. In some embodiments, after step 114 the method may loop back to step 106 in an iterative process for detecting whether or not the registration errors have been properly corrected. In such embodiments, at step 106 processor may receive, e.g., from image quality control station 55, a revised DI acquired from the SDI printed by system 10, as described in step 114. Moreover, steps 108-110 will be carried out on the revised DI, rather than on the DI, as part of the iterative process for improving the correction of one or more registration errors.

In some embodiments, the method of FIG. 2 may terminate after completion of step 114, e.g., using a single set of registration error estimation and correction steps, so as to obtain a specified registration level of the printed digital image.

In other embodiments, the method of FIG. 2 may terminate after completion of several iterations of steps 106-114, until obtaining sufficiently high level of registration, e.g., within the specified level.

Additionally or alternatively, the method of FIG. 2 may be applied, mutatis mutandis, for correcting any other errors in image printing. For example, the method may be used for estimating and correcting a shift of a given pattern of the printed image relative to a position of the given pattern in the RDI. The method may be used for estimating and correcting a missing pattern and/or a distorted pattern, in the printed image. The method may be further used for estimating and correcting a non-uniform thickness and/or a non-uniform width, of a pattern in the printed image. Moreover, the method may be used for estimating and correcting a deviations in at least one of (a) a profile and (b) a linearity, of one or more colors of the printed image.

In other embodiments, the method may be used, mutatis mutandis, for detecting and/or estimating various types of defects, such as but not limited to (i) defects in the substrate (e.g., blanket 44 and/or sheet 50), such as a scratch, a pin hole, and a broken edge, and (ii) printing-related defects, such as irregular color spots, satellites, and splashes. Note that in such embodiments, step 112 may be replaced with identifying and repairing or replacing the malfunctioning part or station of system 10, and step 114 may be replaced with printing the DI.

Selecting and Tracking Anchor Features in Digital Images

Figure 3:
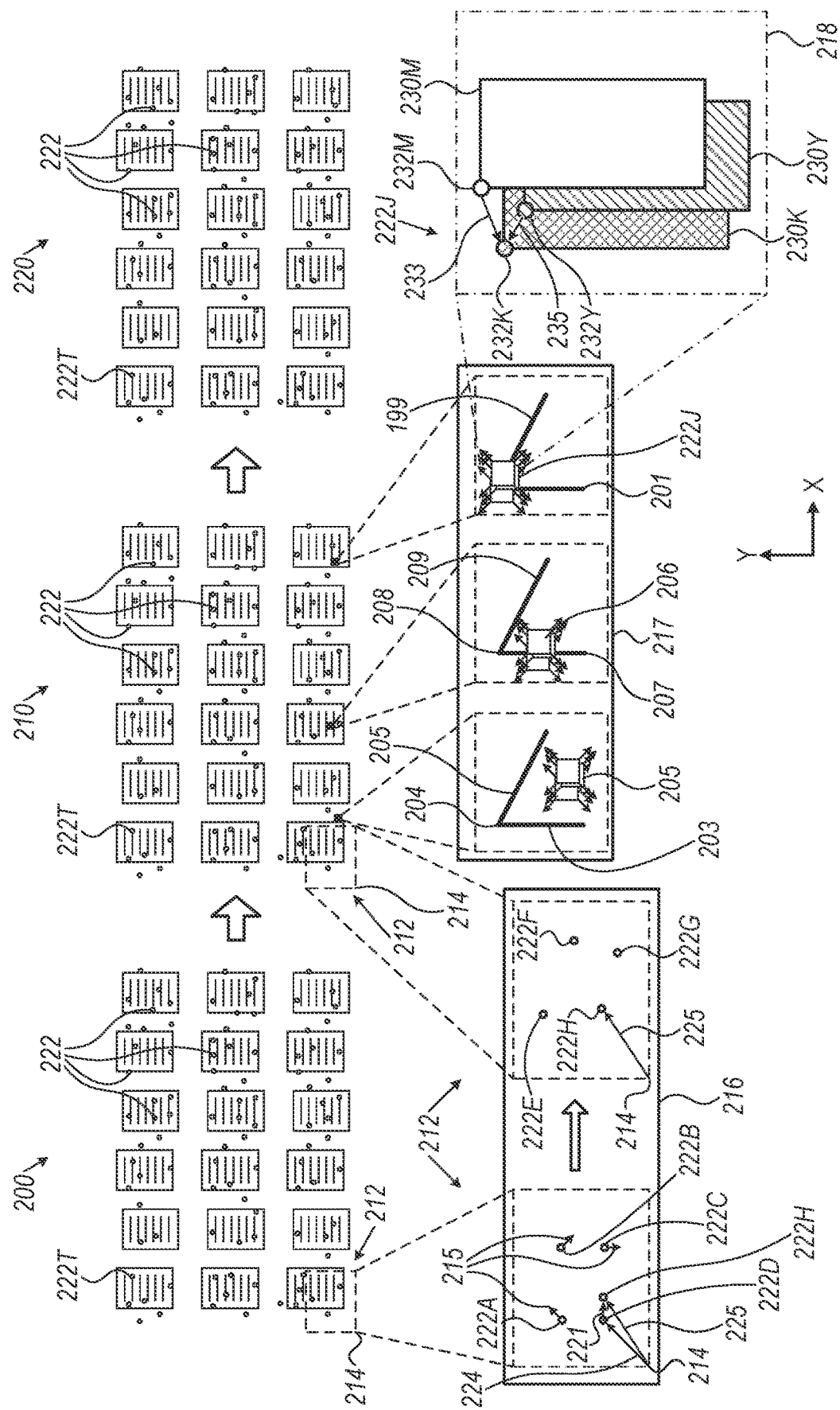
FIG. 3 is a diagram that schematically illustrates a method for selecting anchor features and estimating registration errors in digital images, in accordance with an embodiment of the present invention.

FIG. 3 is a diagram that schematically illustrates a method for selecting anchor features and estimating registration errors in digital images, in accordance with an embodiment of the present invention. FIG. 3 describes in detail embodiments of steps 104, 106 and 110 of FIG. 2 above.

In some embodiments, processor 20 receives, e.g., from an end client of an image to be printed in system 10, an RDI 200 and selects in RDI 200 one or more regions having anchor features, referred to herein as anchors 222.

As described in FIG. 2 above, in other embodiments, processor 20 may select anchors 222 from a digital image acquired from a printed image. For example, the digital image may comprise a DI 210 acquired from the first image printed in system 10, and processor 20 may select anchors 222 in DI 210 rather than in RDI 200.

In some embodiments, the selection of anchors 222 may be carried out in RDI 200 before printing a printed version of RDI 200 in system 10. In such embodiments, processor 20 may improve the productivity of system 10 by having anchors 222 already set before system 10 starts the printing process.

Reference is now made to an inset 217 showing a predefined criterion for selecting anchor 222 based on the position of a candidate anchor feature relative to a geometrical feature in the image.

In the example shown in inset 217, processor 20 may check, e.g., in RDI 200 or in DI 210, whether or not three candidate regions 205, 206 and 222J, are suitable for sensing a registration error in DI 210 and subsequent DI's acquired from respective images printed in system 10.

In some embodiments, processor 20 may produce, in candidate regions 205, 206 and 222J, multiple versions of the candidate anchor features, and may shift the candidate features in a xy plane, shown in inset 217 by arrows extending from candidate regions 205, 206 and 222J. These shifts may simulate registration errors of candidate regions 205, 206 and 222J in DI 210 and/or in the aforementioned subsequent DI's.

In an embodiment, candidate region 205 is located at a bare region, which is located sufficiently far from a corner 204 and lines 203 and 205. In this embodiment, none of the shifted versions of region 205 cross or located in close proximity to lines 203 and 205 or corner 204, therefore, candidate region 205 is not suitable for sensing a registration error, and may receive, by processor 20, a low score of a geometrical gradient.

The score of the geometrical gradient may be calculated using various types of corner detection algorithms, such as but not limited to Harris-Stephens, and Shi-Tomasi, or using any other suitable technique.

For example, processor 20 may calculate the geometrical gradients by estimating the eigenvalues of a structure tensor, which is described herein using equation (1):

$$M = \sum_{u,v=0}^{n-1} w(u,v) \begin{bmatrix} I_x^2(u,v) & I_x(u,v)I_y(u,v) \\ I_x(u,v)I_y(u,v) & I_y^2(u,v) \end{bmatrix} \quad (1)$$

wherein M denotes a structure tensor that could be defined for each point of the image, w denotes the windows that slides over the image (Box filter or Gaussian could be used), u and v denote the horizontal and vertical coordinates of the image respectively, $I_x$ and $I_y$ denote the horizontal and vertical derivatives of the image respectively In an embodiment, candidate region 206 is positioned along a line 207, but is located sufficiently far from a corner 208 and from a line 209. In this configuration, processor 20 may sense any shift of candidate region 206 along x-axis but will not sense a shift of candidate region 206 along y-axis.

In an embodiment, candidate region 222J is positioned on a corner (not shown) where lines 199 and 201 are crossing one another. In this configuration, processor 20 may sense any shift of candidate region 222J along x-axis, y-axis and any combination thereof, by returning high value of the geometrical gradient in equation (1).

In this embodiment, candidate region 222J may be suitable for sensing various types of registration errors in RDI 200, and on any digital image such as DI and 210 and DI 220, which are digital images acquired, respectively, from first and second images of RDI 200 printed by system 10.

In some embodiments, anchors 222 are selected such that they are distributed as even as possible along the digital image. For example, a frame 212 contains four regions having anchor features, referred to herein as anchors 222A, 222B, 222C, and 222D.

Reference is now made to an inset 216 having frames 212 of RDI 200 and DI 210. In some embodiments, the position of anchors 222A, 222B, 222C, and 222D may be measured relative to a predefined reference point that may be located at an edge of the image or at any other suitable distinguishable reference point of the digital image. In the example of FIG. 3, a corner 214 of frame 212 may be used as the reference point for estimating a registration error of any of anchors 222A, 222B, 222C, and 222D.

In the example of inset 216, processor 20 is configured to measure a distance 224 between corner 214 and the position of anchor 222D in RDI 200.

Reference is now made to frame 212 of DI 210 in inset 216. In an embodiment, processor 20 may detect an anchor 222H, which is the shifted position of anchor 222D, and measures in frame 212, a distance 225 between corner 214 and anchor 222H. The same process applies for anchors 222E, 222F and 222G, which are the shifted positioned of anchors 222A, 222B and 222C, respectively.

Reference is now made back to frame 212 of RDI 210 in inset 216. In some embodiments, processor 20 is configured to estimating, in the printed image of the DI, a variation of the distance measured in the image of the RDI. In the example of frame 212 of RDI 210 in inset 216, processor 20 estimates the variation between distances 224 and 225 by subtracting between the vectors of distances 224 and 225 and calculating a vector 221, indicative of the variation between distances 224 and 225.

In some embodiments, processor 20 conducts the same estimation for anchors 222A, 222B and 222C, and estimates the respective variations that are shown in inset 216 as arrows 215. Reference is now made back to the general view of FIG. 3. In such embodiments, processor 20 is configured to identify, in subsequent digital images such as DI 220, all the anchors, such as anchors 222 and 222T, selected in RDI 200 and/or DI 210, and to estimate registration errors, such as ITS registration errors, in subsequent digital images (e.g., DI 220) acquired from subsequent images printed in system 10.

Reference is now made to an inset 218, comprising three color images 230M (magenta), 230Y (yellow) and 230K (black) of candidate region 222J selected by processor 20 to be an anchor as described above in inset 217. In some embodiments, processor 20 is configured to select anchors 232M, 232Y and 232K in color images 230M, 230Y and 230K, respectively, and to calculate the color-to-color (CTC) gradient between anchors 232M, 232Y and 232K.

In some embodiments, processor 20 may calculate the CTC gradient by calculating the structure tensor of equation (1) for anchors 232M, 232Y and 232K.

In the example of inset 218, processor 20 is configured to estimate the CTC registration error between color images 230M, 230Y and 230K, by calculating distances between anchors 232M and 232K, and between anchors 232Y and 232K, shown as arrows 233 and 235, respectively.

In an embodiment, at least one of the CTC gradient and CTC registration error may be carried out using deep learning techniques, as will be described in detail in FIGS. 4-6 below.

Note that DI 210 may have some registration errors that may affect the score of the one or more selection criteria described in insets 217 and 218 above.

Estimating Registration Errors Using Deep Learning

Figure 4:
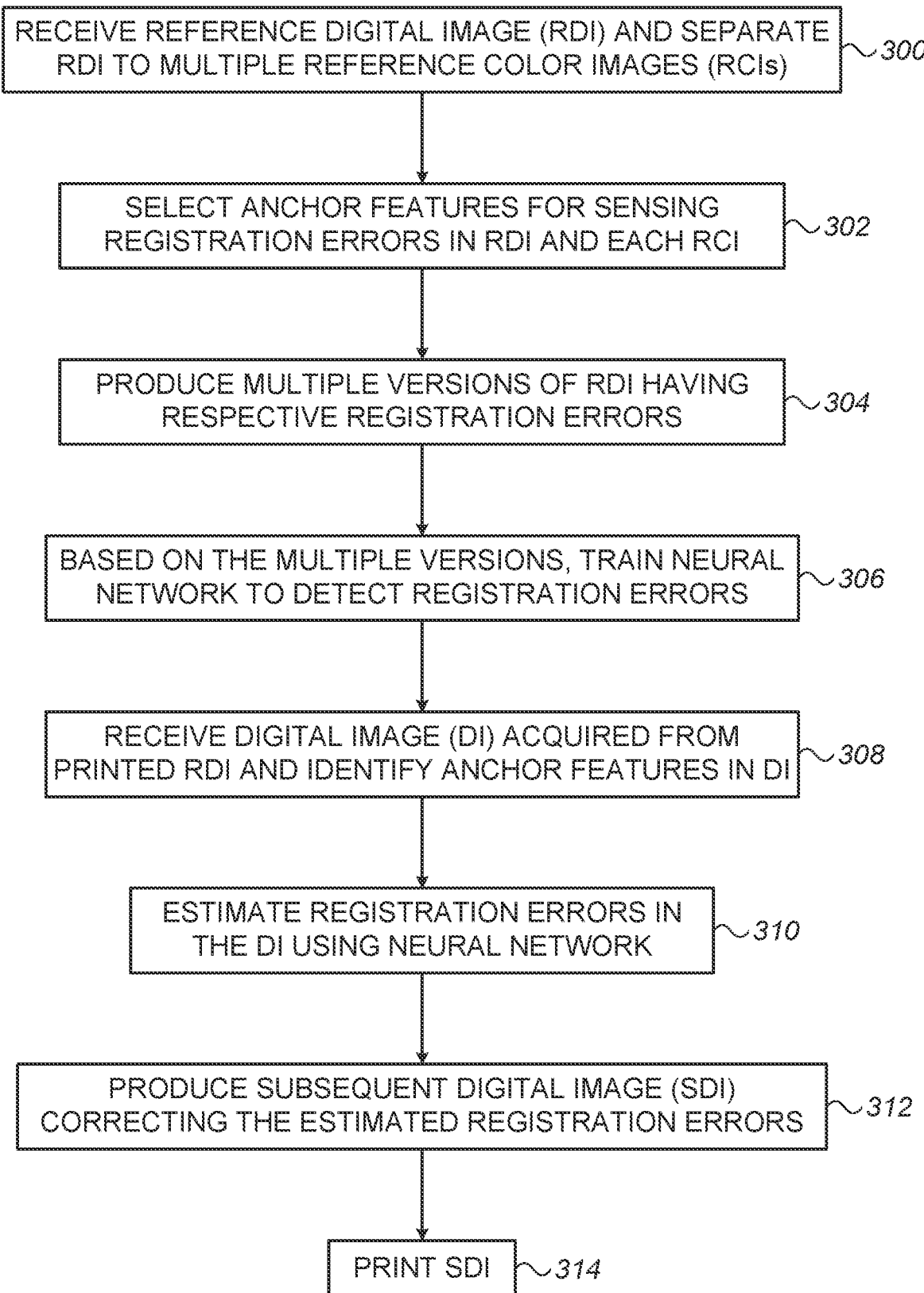
FIG. 4 is a flow chart that schematically shows a method for estimating and correcting registration errors in image printing using deep learning, in accordance with an embodiment of the present invention.

FIG. 4 is a flow chart that schematically shows a method for estimating and correcting registration errors in image printing using deep learning, in accordance with an embodiment of the present invention.

For the sake of concreteness and clarity, the method of FIG. 4 is described hereinbelow with reference to the elements of system 10. The principles of this method, however, are not limited to this particular system configuration and can be applied, mutatis mutandis, in other sorts of printing systems (such as, but not limited to digital printing on continuous web substrate) that require detection and compensation of various types of registration errors.

The method begins at a step 300 with processor 20 receiving a RDI, such as RDI 200, to be printed on blanket 44 and subsequently transferred to sheet 50 as described in FIGS. 2 and 3 above. In some embodiments, processor 20 separates RDI 200, which comprises multiple colors, to multiple RCIs of the aforementioned colors.

As described in FIG. 2 above, RDI 200 may comprise a red-green-blue (RGB) image. In some embodiments, processor 20 is configured to convert the RGB image into a combination of colors (e.g., CMYK) supplied by system 10, and is further configured to separate the image to multiple (e.g., four) color images of the respective CMYK ink droplets supplied by print bars 62, as described in FIG. 1 above.

At a step 302 processor 20 selects, based on a predefined selection criterion, one or more regions in RDI 200 and in each RCI, which are suitable for use as anchor features for sensing registration errors in the RDI and RCIs.

As described in FIG. 2 above, processor 20 is configured to select the regions having the anchor features in any type of digital image, such as but not limited to an image acquired from a printed image, or a digital image provided in any suitable format, such as but not limited to PDF file format.

At a step 304, processor 20 is configured to produce multiple versions of RDI 200 having respective registration errors. In some embodiments, processor 20 is configured to produce a version of RDI 200 by shifting an anchor feature of a RCI relative to another RCI of the same anchor feature. For example, in a given anchor feature of a RDI 200, processor 20 may shift (e.g., a few tens of microns in x and y axes) a yellow RCI relative to a black RCI. The predefined shifting of the RCI anchor features relative to one another is referred to herein as ground truth, and is depicted in detail in FIG. 5 below.

In other embodiments, processor 20 is configured to receive other suitable type of images, such as but not limited to simulated images.

At a step 306, based on the multiple versions, processor 20 is configured to train a neural network to detect registration errors, such as but not limited to CTC registration errors, which may appear for example in anchors 222 of FIG. 3 above. The architecture of the neural network, and the training process thereof are described in detail in FIGS. 5 and 6 below.

In other embodiments, processor 20 is configured to train the neural network using any other suitable type of images, such as but not limited to the aforementioned simulated images of step 304 above. In such embodiments, processor 20 may train the neural network before receiving RDI 200 and the versions thereof.

At a step 308, processor 20 receives, e.g., from image quality control station 55 or from any other image acquisition apparatus, a DI, such as DI 210 shown in FIG. 3 above. DI 210 is acquired from an image of RDI 200 that is printed by system 10. In some embodiments, processor 20 is configured to identify in DI 210, the one or more regions having the anchor features.

At a step 310, processor 20 is configured to estimate the CTC registration error in DI 210, by applying deep learning techniques to the neural network that was trained as described in step 306 above. The deep learning process and architecture of the neural network are described in detail in FIG. 6 below.

At a step 312, processor 20 produces a SDI, which is based on RDI 200 and is correcting the CTC and other registration errors estimated in DI 210, as described in step 310 above.

At a step 314, processor 20 controls system 10 to print the SDI image. In some embodiments, after step 314 the method may loop back to step 308 in an iterative process for detecting whether or not the CTC and other registration errors have been properly corrected. In such embodiments, at step 308 processor may receive, e.g., from image quality control station 55, a revised DI acquired from the SDI printed by system 10, as described in step 314.

In some embodiments, processor 20 is configured to estimate the registration error (as described in step 310 above) on the revised DI, rather than on DI 210, as part of the iterative process for improving the correction of the CTC registration error, and of other types of registration errors as described, for example, in FIG. 2 above.

In some embodiments, the method of FIG. 4 may terminate after completion of step 314, e.g., using a single set of registration error estimation and correction steps, so as to obtain a specified CTC registration level of the printed digital image.

In other embodiments, the method of FIG. 4 may terminate after completion of several iterations of steps 308-314, until obtaining sufficiently high level of CTC and other types of registration.

Additionally or alternatively, the method of FIG. 4 may be applied, mutatis mutandis, for correcting any other errors in image printing. For example, the method may be used for estimating and correcting a shift of a given pattern of the printed image relative to a position of the given pattern in the RDI. The method may be used for estimating and correcting a missing pattern and/or a distorted pattern, in the printed image. The method may be further used for estimating and correcting a non-uniform thickness and/or a non-uniform width, of a pattern in the printed image. Moreover, the method may be used for estimating and correcting a deviations in at least one of (a) a profile and (b) a linearity, of one or more colors of the printed image.

In other embodiments, the method may be used, mutatis mutandis, for detecting and/or estimating various types of defects, such as but not limited to (i) defects in the substrate (e.g., blanket 44 and/or sheet 50), such as a scratch, a pin hole, and a broken edge, and (ii) printing-related defects, such as irregular color spots, satellites, and splashes. Note that in such embodiments, (a) step 312 may be replaced with identifying and repairing or replacing the malfunctioning part or station of system 10, and (b) step 314 may be replaced with printing the DI.

Training Neural Network to Detect Registration Errors

Figure 5:
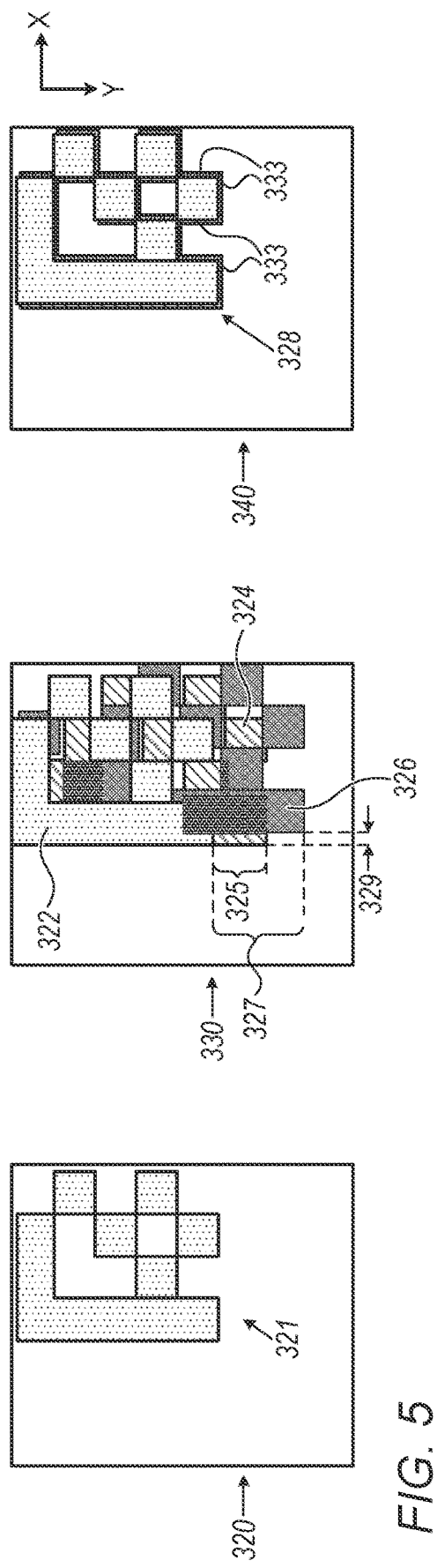
FIG. 5 is a schematic pictorial illustration showing training of a neural network for detecting color-to-color (CTC) registration errors in a patch of a reference digital image, in accordance with an embodiment of the present invention.

FIG. 5 is a schematic pictorial illustration showing training of a neural network for detecting CTC registration errors in a region 320 of RDI 200, in accordance with an embodiment of the present invention.

In some embodiments, region 320 comprises an anchor feature 321 having CMYK RCIs. Note that in RDI 200 all RCIs are aligned so that anchor feature 321 comprises a single pattern.

Reference is now made to a region 330, which is a version of region 320 of RDI 200. In some embodiments, region 330 comprises anchor feature 321 shown in a black RCI 322, a cyan RCI 324, a magenta RCI 326, and a yellow RCI, which is aligned with black RCI 322 and is therefore not shown. As described in step 304 of FIG. 4 above, processor 20 produce region 330 having the ground truth CTC registration errors by shifting RCIs relative to one another.

In the example of FIG. 5, processor 20 shifts cyan RCI 324 relative to black RCI 322, by a distance 325 of about 15 µm along y axis, and further shifts magenta RCI 326 relative to black RCI 322, by a distance 327 of about 25 µm along y axis, and by a distance 329 of about 5 µm along x axis.

In some embodiments, processor 20 applies region 330 to the neural network for training and after one or more training iterations, the neural network learns and qualifies (as will be described below) to output an estimation of the CTC registration errors in region 330.

In other embodiments, processor 20 is configured to produce any other suitable version of the registration error. Additionally or alternatively, processor 20 may apply augmented errors to the selected region having the registration error. For example, processor 20 may flip the anchor feature in x-axis and rotate the same anchor feature in y-axis. Moreover, processor 20 may blur and/or add noise to at least part of the selected region and/or anchor feature.

In the context of the present disclosure, the term "augmentation" refers to errors applied to the selected region in addition to the ground truth registration errors. This augmentation may improve the robustness of the trained neural network to detect and estimate various types of registration errors in DIs having one or more of the aforementioned augmented errors.

Reference is now made to a region 340, which is a subsequent image produced by processor 20 after correcting the CTC registration errors estimated by the neural network. As shown in the example of region 340, the neural network failed to estimate the exact (i.e., ground truth) registration errors shown as distances 325, 327 and 329, so that the pattern of an anchor feature 328 comprises CTC registration errors 333 (e.g., of a few micron) of the cyan and magenta RCIs, relative to the black RCI.

In some embodiments, processor 20 holds one or more thresholds indicative of the specified CTC registration error in x and y axes (and a combination thereof). Processor 20 is configured to detect CTC registration errors 333 in region 340 and to compare the detected CTC registration errors 333 with the aforementioned thresholds.

If CTC registration error 333 is smaller than the respective threshold, the neural network concludes the training of the neural network on the CTC registration errors applied to anchor feature 321. If CTC registration error 333 is larger than the respective threshold, the neural network has to be trained with additional examples of CTC registration errors applied to anchor feature 321.

In some embodiments, processor 20 is configured to calculate the qualification level of the trained neural network to detect CTC registration errors using a loss function. In such embodiments, the loss function is configured to calculate the difference between the ground truth and the output of the neural network. In the present example, the ground truth refers to the predetermined shift of RCIs 322, 324 and 326, shown in region 330 as distances 325, 327 and 329. The output of the neural network refers to the CTC registration errors estimated by the neural network.

In such embodiments, the loss function outputs numeric values of CTC registration errors 333 shown in region 340, and the process for obtaining the output is described in detail in FIG. 6 below.

The loss function is provided using equation (2):

$$\mathcal{L}(X,\hat{X}) = \Sigma_{i=(c,m,y,k)}(x_i - \hat{x}_i)^2 \qquad (2)$$

wherein $\mathcal{L}(X,\hat{X})$ denotes the loss function,
c denotes the cyan color,
m denotes the magenta color,
y denotes the yellow color,
k denotes the black color,
$X=(x_c,x_m,x_y,x_k)$ denotes the ground truth CTC registration error, also referred to herein as a true color shift of the printed or simulated region, and
$\hat{X}=(\hat{x}_c,\hat{x}_m,\hat{x}_y,\hat{x}_k)$ denotes the estimated CTC registration error, also referred to herein as color shifts, predicted by the neural network.

In some embodiments, processor 20 is configured to define the true color shifts relative to one of the colors that may be selected using any suitable technique. For example, in case processor 20 selects the cyan color to serve as a reference color, then $x_c$ may equal zero and the rest of the shifts are typically scalar values other than zero. In case one or more of the RCIs are not shifted relative to the reference RCI, the true color shift may also be equal to zero. For example, if the yellow RCI is not shifted relative to the cyan RCI, then $x_y$ may also equal zero.

As described above, processor 20 holds one or more thresholds indicative of the specified CTC registration error in anchor feature 321. In some embodiments, processor 20 is configured to determine whether the neural network is qualified (e.g., sufficiently trained) to estimate, e.g., in DI 210, CTC registration errors in anchor feature 321 by comparing the output of the loss function with the aforementioned thresholds.

If the output of the loss function is smaller than the respective threshold, the neural network concludes the training of the neural network on anchor feature 321. If the output of the loss function is larger than the respective threshold, the neural network is not sufficiently trained, and processor 20 may continue training the neural network with additional examples of CTC registration errors applied to anchor feature 321.

In some embodiments, the neural network is typically trained using an iterative process, such that processor 20 feeds examples of CTC registration errors having a given ground truth and compares between the loss function and the specified level thereof. As described above, the neural network improves the estimation accuracy of the CTC registration error during the iterative process.

In some embodiments, the learning rate of the neural network is measured by the number of iterations, also referred to herein as number of epochs (#epochs), for obtaining a sufficiently-low output of the loss function (e.g., smaller than the specified threshold).

In some embodiments, each epoch may comprise any suitable number of training examples, e.g., approximately 10-100 examples. In such embodiments, the output of the loss function may be sufficiently-low after any suitable number of iterations, for example, within 500 epochs. Note that the number of examples per epoch, and the #epochs is provided by way of example, and in other embodiments, may have any other suitable numbers.

This particular use case of neural network for estimating CTC registration errors is provided by way of example, in order to illustrate certain problems, such as CTC registration errors, that are addressed by embodiments of the present invention and to demonstrate the application of these embodiments in enhancing the CTC registration performance of system 20. Embodiments of the present invention, however, are by no means limited to this specific sort of example use case, and the principles described herein may similarly be applied to other sorts of registration errors, such as but not limited to image-to-substrate registration error.

Figure 6:
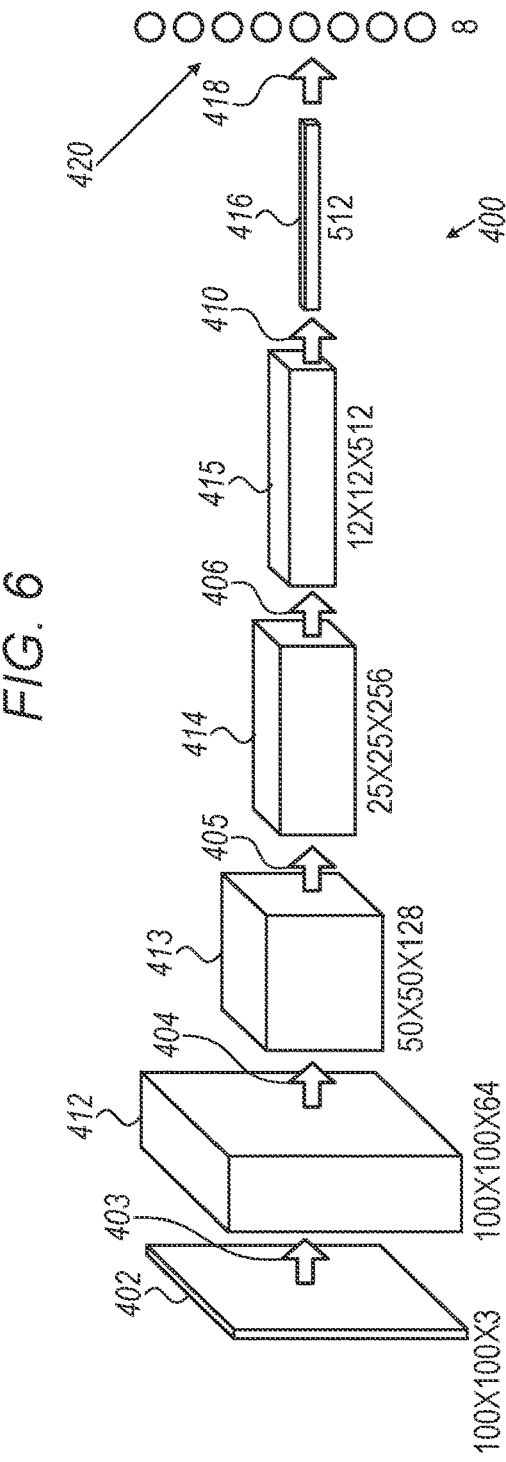
FIG. 6 is a schematic pictorial illustration of a convolutional neural network (CNN), in accordance with an embodiment of the present invention.

Deep Learning of Registration Errors Using Multi-Layered Convolutional Neural Network Architecture FIG. 6 is a schematic pictorial illustration of a convolutional neural network (CNN) 400, in accordance with an embodiment of the present invention. In some embodiments, the elements of CNN 400 may be implemented in hardware or software, or in any suitable combination thereof.

In some embodiments, processor 20 is configured to train CNN 400 for detecting and estimating registration errors, such as CTC registration errors, as described above, for example, in step 306 of FIG. 4 and in FIG. 5. After concluding the training and qualifying CNN 400 on a given set of anchor features and variations thereof, processor 20 is configured to apply CNN 400 to DI 210, as described in step 310 of FIG. 4 above and/or to any other suitable digital image comprising the given set of anchor features.

In some embodiments, CNN 400 may comprise a multi-layered convolutional neural network, each of the layers having an array of neurons, in the present example CNN 400 comprises a five-layer convolutional neural network.

In some embodiments, each neuron in CNN 400 computes an output value by applying a specific function to the input values coming from the receptive field in the previous layer. The function that is applied to the input values is determined by a vector of weights and a bias (typically real numbers). The learning process in CNN 400, progresses by making iterative adjustments to these biases and weights.

The vector of weights and the bias are referred to herein as filters of the layers and represent particular features of the input (e.g., a particular shape). A distinguishing feature of CNNs is that many neurons can share the same filter. This reduces memory footprint because a single bias and a single vector of weights are used across all receptive fields sharing that filter, as opposed to each receptive field having its own bias and vector weighting.

In some embodiments, CNN 400 is configured to receive an input 402 comprising an array of 100 by 100 weights, corresponding to the 100 by 100 pixels of the respective digital image, each of the pixels having three colors (e.g., RGB as described in FIGS. 2 and 4 above).

In some embodiments, CNN 400 is configured to apply batch normalization and max pooling (BNMP), referred to herein as a BNMP 403 to input 402, so as to accelerate learning of CNN 400. Batch normalization is a technique designed to automatically standardize the inputs to a layer in a deep learning neural network. Once implemented, batch normalization has the effect of accelerating the training process of CNN 400. In some embodiments, processor 20 is configured to add batch normalization after an activation function between a convolutional and max pooling layers, using any suitable technique. Pooling layers are configured to reduce the dimensions of the data by combining the outputs of neuron clusters at one layer into a single neuron in the next layer. The term "Max pooling" refers to pooling that uses the maximum value from each of a cluster of neurons at the prior layer.

In some embodiments, CNN 400 may apply any suitable number of BNMPs between any suitable number of the convolutional layers (CLs) thereof. In the example of FIG. 6, CNN 400 comprises CLs 412, 413, 414 and 415, and BNMPs 404, 405 and 406 are applied therebetween. As shown in FIG. 6 and will be described in detail herein, BNMP 404 is applied between CLs 412 and 413, BNMP 405 is applied between CLs 413 and 414, and BNMP 406 is applied between CLs 414 and 415.

In some embodiments, CL 412 comprises 64 filters applied to the input array of 100 by 100 weights (e.g., pixels) of input 402. Subsequently, processor 20 applies, to the output of CL 412, BNMP 404, which is configured to reduce the dimension of the data from 100 by 100 weights to 50 by 50 weights, and further applies the input of 50 by 50 weights to CL 413 having 128 filters. Subsequently, processor 20 applies, to the output of CL 413, BNMP 405, which is configured to reduce the dimension of the data from 50 by 50 weights to 25 by 25 weights, and further applies the input of 25 by 25 weights to CL 414 having 256 filters.

In some embodiments, processor 20 applies, to the output of CL 414, BNMP 406, which is configured to reduce the dimension of the data from 25 by 25 weights to 12 by 12 weights, and further applies the input of 12 by 12 weights to CL 415 having 512 filters.

In some embodiments, processor 20 applies, to the output of CL 415, batch normalization and global average pooling, referred to herein as a BNAP 410. The average pooling uses the average value from each of a cluster of neurons at the prior layer, so that in the present example, BNAP 410 is configured to convert the output tensor of CL 415 to a vector 416 of weights having, in the present example, 512 scalar numbers. In the context of the present invention, the term "flatten" refers to conversion of a multi-dimensional tensor into a one-dimensional vector.

In some embodiments, CNN 400 comprises a dense layer 418, which is configured to connect vector 416 to a fully-connected layer (FCL) 420 of CNN 400. Note that term "fully connected layer" refers to a neural network layer that connects every neuron in one layer to every neuron in another layer.

In some embodiments, during the learning process of CNN 400, at least one of, and typically all CLs 412-415, are configured to update one or more of their weights, and FCL 420 is configured to output the estimated registration error.

In some embodiments, FCL 420 may comprise multiple output numbers indicative of the registration error of each printed color in x and y axes of the printed image.

In the example of FIG. 6, FCL 420 comprises eight outputs corresponding to the registration error in x and y axes, estimated by CNN 400 for each color from among the CMYK colors. For example, the first and second outputs of FCL 420 correspond to the estimated registration error of the cyan color in x and y axes, respectively.

The configuration of CNN 400 is simplified for the sake of conceptual clarity and is provided by way of example. In other embodiments, CNN 400 may have any other configuration suitable for the training, described for example in FIG. 5 above, and for estimating the registration error in digital images acquired from printed images, such as DIs 210 and 220 shown in FIG. 3 above.

Although the embodiments described herein mainly address estimation and correction of registration errors in digital printing, the methods and systems described herein can also be used in any other types of suitable applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for correcting an error in image printing, the method comprising:
   receiving a reference digital image (RDI);
   selecting, based on a predefined selection criterion, one or more regions in the RDI that are suitable for use as anchor features for sensing the error;
   receiving a digital image (DI) acquired from a printed image of the RDI, and identifying the one or more regions in the DI;
   estimating, based on the anchor features of the DI, the error in the printed image by training a neural network to detect the error in the one or more regions, and wherein training the neural network comprises producing multiple versions of the RDI having respective errors;
   calculating a correction that, when applied to the DI, compensates for the estimated error;
   correcting the estimated error in a subsequent digital image (SDI) to be printed; and
   printing the SDI having the corrected error.

2. The method according to claim 1, wherein the error comprises a registration error, and wherein training the neural network comprises comparing, in a selected region, between a predefined registration error produced in the selected region, and an output registration error estimated by the neural network, and applying, to the predefined and the output registration errors, a loss function, and comparing an output of the loss function to a threshold.

3. The method according to claim 1, wherein the RDI comprises at least a first reference color image (RCI) having a first color, and a second RCI having a second color, and wherein producing the multiple versions comprises shifting, in the region, at least part of the first RCI relative to the second RCI.

4. The method according to claim 1, wherein training the neural network comprises training a multi-layered convolutional neural network comprising at least five layers.

5. The method according to claim 1, wherein the error comprises a registration error, and wherein estimating the registration error comprises estimating an image-to-substrate (ITS) registration error by (i) measuring, in the RDI, a distance between at least one of the anchor features and a given region at an edge of the printed image, and (ii) estimating, in the printed image of the DI, a variation of the distance.

6. A system for correcting an error in image printing, the system comprising:
   a processor, which is configured to:
      receive a reference digital image (RDI);
      select, based on a predefined selection criterion, one or more regions in the RDI that are suitable for use as anchor features for sensing the error;
      receive a digital image (DI) acquired from a printed image of the RDI, and identify the one or more regions in the DI;
      estimate, based on the anchor features of the DI, the error in the printed image by training a neural network to detect the error in the one or more regions, and wherein the processor is configured to produce, for the training, multiple versions of the RDI having respective errors;
      calculate a correction that, when applied to the DI, compensates for the estimated error; and
      correct the estimated error in a subsequent digital image (SDI) to be printed; and
   a printing subsystem configured to print the SDI having the corrected error.

7. The system according to claim 6, wherein the error comprises a registration error, and wherein the processor is configured to: (i) compare, in a selected region, between a predefined registration error produced in the selected region, and an output registration error estimated by the neural network, (ii) apply, to the predefined registration error and to the output registration error, a loss function, and (iii) compare an output of the loss function to a threshold.

8. The system according to claim 6, wherein the RDI comprises at least a first reference color image (RCI) having a first color, and a second RCI having a second color, and wherein the processor is configured to shift, in the region, at least part of the first RCI relative to the second RCI.

9. The system according to claim 6, wherein the processor is configured to train a multi-layered convolutional neural network comprising at least five layers.

10. The system according to claim 6, wherein the error comprises a registration error, and wherein the processor is configured to estimate an image-to-substrate (ITS) registration error, by (i) measuring, in the RDI, a distance between at least one of the anchor features and a given region at an edge of the printed image, and (ii) estimating, in the printed image of the DI, a variation of the distance.

11. A method for correcting a registration error in image printing, the method comprising:
   receiving a reference digital image (RDI);
   producing multiple versions of the RDI having respective registration errors, and selecting, based on a predefined selection criterion, one or more regions in the RDI that are suitable for use as anchor features for sensing the registration error, wherein producing the multiple versions comprises applying to at least part of at least one of the regions, one or more errors selected from a list consisting of: (a) flipping in one or more axes, (b) rotating in one or more axes, (c) image blurring, and (d) adding noise, and wherein selecting the one or more regions comprises training a neural network using the multiple versions;

receiving a digital image (DI) acquired from a printed image of the RDI, and identifying the one or more regions in the DI;

estimating, based on the anchor features of the DI, the registration error in the printed image;

calculating a correction that, when applied to the DI, compensates for the estimated registration error;

correcting the estimated registration error in a subsequent digital image (SDI) to be printed; and printing the SDI having the corrected registration error.

12. A method for correcting a registration error in image printing, the method comprising:

receiving a reference digital image (RDI);

selecting, based on a predefined selection criterion, one or more regions in the RDI that are suitable for use as anchor features for sensing the registration error;

receiving a digital image (DI) acquired from a printed image of the RDI, and identifying the one or more regions in the DI;

estimating, based on the anchor features of the DI, the registration error in the printed image, by estimating, in at least one of the regions of the DI, a color-to-color (CTC) registration error between the first and second colors by (i) measuring, in at least one of the regions of the RDI image, a given distance between the first color and the second color, and (ii) estimating, in the printed image of the DI, a variation of the given distance;

calculating a correction that, when applied to the DI, compensates for the estimated registration error;

correcting the estimated registration error in a subsequent digital image (SDI) to be printed; and printing the SDI having the corrected registration error.

13. A method for correcting an error in image printing, the method comprising:

receiving a reference digital image (RDI);

selecting, based on a predefined selection criterion, one or more regions in the RDI that are suitable for use as anchor features for sensing the error;

receiving a digital image (DI) acquired from a printed image of the RDI, and identifying the one or more regions in the DI;

estimating, based on the anchor features of the DI, the error in the printed image, wherein the error comprises at least one of: (a) a shift of a given pattern of the printed image relative to a position of the given pattern in the RDI, (b) a missing pattern, (c) a non-uniform thickness of a pattern in the printed image, (d) a non-uniform width of the pattern in the printed image, (e) a deviation in a profile of one or more colors of the printed image, and (f) a deviation in a linearity of one or more colors of the printed image;

calculating a correction that, when applied to the DI, compensates for the estimated error;

correcting the estimated error in a subsequent digital image (SDI) to be printed; and printing the SDI having the corrected error.

14. A system for correcting a registration error in image printing, the system comprising:

a processor, which is configured to:
receive a reference digital image (RDI);
produce multiple versions of the RDI having respective registration errors, and select, based on a predefined selection criterion, one or more regions in the RDI that are suitable for use as anchor features for sensing the registration error, wherein the processor is configured to produce the multiple versions by applying to at least part of at least one of the regions, one or more errors selected from a list consisting of: (a) flipping in one or more axes, (b) rotating in one or more axes, (c) image blurring, and (d) adding noise, and wherein selecting the one or more regions comprises training a neural network using the multiple versions;
receive a digital image (DI) acquired from a printed image of the RDI, and identify the one or more regions in the DI;
estimate, based on the anchor features of the DI, the registration error in the printed image;
calculate a correction that, when applied to the DI, compensates for the estimated registration error; and
correct the estimated registration error in a subsequent digital image (SDI) to be printed; and a printing subsystem, which is configured to print the SDI having the corrected registration error.

15. A system for correcting a registration error in image printing, the system comprising:

a processor, which is configured to:
receive a reference digital image (RDI);
select, based on a predefined selection criterion, one or more regions in the RDI that are suitable for use as anchor features for sensing the registration error;
receive a digital image (DI) acquired from a printed image of the RDI, and identify the one or more regions in the DI;
estimate, based on the anchor features of the DI, the registration error in the printed image, by estimating, in at least one of the regions of the DI, a color-to-color (CTC) registration error between the first and second colors by (i) measuring, in at least one of the regions of the RDI image, a given distance between the first color and the second color, and (ii) estimating, in the printed image of the DI, a variation of the given distance;
calculate a correction that, when applied to the DI, compensates for the estimated registration error; and
correct the estimated registration error in a subsequent digital image (SDI) to be printed; and a printing subsystem, which is configured to print the SDI having the corrected registration error.

16. A system for correcting an error in image printing, the system comprising:

a processor, which is configured to:
receive a reference digital image (RDI);
select, based on a predefined selection criterion, one or more regions in the RDI that are suitable for use as anchor features for sensing the error;
receive a digital image (DI) acquired from a printed image of the RDI, and identify the one or more regions in the DI;
estimate, based on the anchor features of the DI, the error in the printed image, wherein the error comprises at least one of: (a) a shift of a given pattern of the printed image relative to a position of the given pattern in the RDI, (b) a missing pattern, (c) a non-uniform thickness of a pattern in the printed image, (d) a non-uniform width of the pattern in the printed image, (e) a deviation in a profile of one or more colors of the printed image, and (f) a deviation in a linearity of one or more colors of the printed image;

calculate a correction that, when applied to the DI, compensates for the estimated error; and correct the estimated error in a subsequent digital image (SDI) to be printed; and a printing subsystem, which is configured to print the SDI having the corrected error.

\* \* \* \* \*